US012637217B2

(12) United States Patent
Latcham

(10) Patent No.: US 12,637,217 B2
(45) Date of Patent: May 26, 2026

(54) TROLLEY

(71) Applicant: PHASLO GLOBAL INNOVATION PTY LIMITED, Birtinya (AU)

(72) Inventor: Damien Barry Latcham, Rockhampton (AU)

(73) Assignee: PHASLO GLOBAL INNOVATION PTY LIMITED, Birtinya (AU)

( * ) Notice: Subject to any disclaimer, the term of this patent is extended or adjusted under 35 U.S.C. 154(b) by 320 days.

(21) Appl. No.: 17/797,211

(22) PCT Filed: Feb. 3, 2021

(86) PCT No.: PCT/GB2021/050236
§ 371 (c)(1),
(2) Date: Aug. 3, 2022

(87) PCT Pub. No.: WO2021/156610
PCT Pub. Date: Aug. 12, 2021

(65) Prior Publication Data
US 2023/0052125 A1 Feb. 16, 2023

(30) Foreign Application Priority Data
Feb. 3, 2020 (GB) ...................................... 2001458

(51) Int. Cl.
*B64D 11/00* (2006.01)
(52) U.S. Cl.
CPC ................................ *B64D 11/0007* (2013.01)
(58) Field of Classification Search
CPC .. B62B 2202/67; B64D 11/04; B64D 11/0007
See application file for complete search history.

(56) References Cited

U.S. PATENT DOCUMENTS

| | | | |
|---|---|---|---|
| 3,984,162 A | * | 10/1976 | Zozzaro ................. A47B 31/00 |
| | | | 312/321 |
| 4,936,377 A | | 6/1990 | DeVogel et al. |
| 6,474,677 B2 | | 11/2002 | Kasuya |
| 7,544,915 B2 | * | 6/2009 | Hu .......................... B62B 3/006 |
| | | | 280/47.36 |

(Continued)

FOREIGN PATENT DOCUMENTS

| | | | | | |
|---|---|---|---|---|---|
| DE | 20016873 U1 | * | 12/2000 | ............. | A47B 31/02 |
| DE | 102009010923 A1 | * | 6/2010 | ............. | B62B 3/006 |

(Continued)

OTHER PUBLICATIONS

Translated DE-20016873-U1 (Year: 2024).*

(Continued)

*Primary Examiner* — James A Shriver, II
*Assistant Examiner* — Ian Bryce Shelton
(74) *Attorney, Agent, or Firm* — Caesar Rivise, PC

(57) ABSTRACT

A trolley (1, 2, 3), e.g. a galley trolley of an aircraft, the trolley (1, 2, 3) having a housing (10, 210, 310) and a compartment (C, 2C, 3C) for the location of goods, the housing (10, 210, 310) comprising walls (11, 11', 12, 12', 13, 211, 211', 212, 212', 311, 311', 312, 312', 313) and a door (14, 214, 214', 314), at least one of said walls being movable between a first condition where it is proximate the compartment (C, 2C, 3C) and a second condition where it is further from the compartment (C, 2C, 3C).

18 Claims, 11 Drawing Sheets

(56)         References Cited

U.S. PATENT DOCUMENTS

| | | | | |
|---|---|---|---|---|
| 8,596,655 | B2 * | 12/2013 | Belanger | B29C 66/126 |
| | | | | 156/92 |
| 9,303,912 | B1 * | 4/2016 | Schalla | A47B 31/02 |
| 9,386,845 | B2 * | 7/2016 | Wu | B64D 11/0007 |
| 9,387,912 | B2 * | 7/2016 | Lee | B61D 37/00 |
| 9,395,116 | B1 * | 7/2016 | Arnold | F25D 3/125 |
| 9,986,823 | B2 * | 6/2018 | Winter | A47B 69/00 |
| 2001/0010419 | A1 * | 8/2001 | Kasuya | A47B 31/06 |
| | | | | 280/33.997 |
| 2005/0193760 | A1 * | 9/2005 | Moran | G01K 11/06 |
| | | | | 374/E11.006 |
| 2005/0218615 | A1 * | 10/2005 | Hu | B62B 3/006 |
| | | | | 280/47.35 |
| 2014/0352929 | A1 * | 12/2014 | Wu | F25D 3/125 |
| | | | | 165/104.34 |
| 2016/0270527 | A1 * | 9/2016 | Winter | B62B 3/004 |
| 2016/0290023 | A1 * | 10/2016 | Boivin | B62B 5/0433 |
| 2017/0247169 | A1 | 8/2017 | Losco | |
| 2022/0411064 | A1 * | 12/2022 | Diks-Warmerdam | |
| | | | | B64D 11/0007 |

FOREIGN PATENT DOCUMENTS

| | | | | | |
|---|---|---|---|---|---|
| EP | 0922413 | A2 * | 6/1999 | | A47B 31/00 |
| EP | 2807957 | A1 * | 12/2014 | | B62B 3/00 |
| FR | 2228353 | A5 * | 11/1974 | | |
| FR | 2654057 | A1 * | 5/1991 | | A47B 96/205 |
| JP | 2001204552 | A * | 7/2001 | | A47B 31/06 |
| JP | 2004101064 | A | 4/2004 | | |
| JP | 2007161894 | A | 6/2007 | | |
| JP | 2007217460 | A | 8/2007 | | |
| JP | 2015160620 | A | 9/2015 | | |
| JP | 2015178931 | A * | 10/2015 | | |
| JP | 2019141229 | A * | 8/2019 | | |
| NL | 1002515 | C1 * | 9/1997 | | G09F 21/04 |
| WO | WO-2015063332 | A1 * | 5/2015 | | G07C 11/00 |

OTHER PUBLICATIONS

Translated JP-2015178931-A (Year: 2025).*
Great Britain Search Report from corresponding GB 2001458.5 mailed Jul. 13, 2020.
International Search Report from corresponding PCT/GB2021/050236 mailed Apr. 23, 2021.
English abstract for FR 2228353 A5 (1974).
English abstract for JP 2019141229 A (2019).
English abstract for NL 1002515 C1 (1997).
Translation of Office Action issued in counterpart Japanese Patent Application No. 2022-547247 mailed Oct. 29, 2024.
English abstract for JP 2004101064 A (2004).
English abstract for JP 2007161894 A (2007).
English abstract for JP 2007217460 A (2007).
English abstract for JP 2015160620 A (2015).
English abstract for JP 2015178931 A (2015).
Search_Report_and_Written_Opinion_Singapore_Application_No. 11202251741Q_Aug. 13, 2025.

* cited by examiner

TROLLEY

CROSS-REFERENCE TO RELATED APPLICATIONS

This application is a U.S. National Phase Application of PCT/GB2021/050236, filed Feb. 3, 2021, which claims priority to GB 2001458.5, filed Feb. 3, 2020, the contents of which applications are incorporated herein by reference in their entireties for all purposes.

FIELD OF INVENTION

This invention relates generally to temperature regulation and in particular to regulating the temperature of or within a trolley e.g. a galley trolley of an aircraft.

BACKGROUND

Trolleys are often used to convey goods. Some goods which are to be conveyed require that the temperature is regulated to ensure that the goods do not perish during transport and/or that the goods are deliverable from the trolley at or near optimum conditions, for example for ingestion. Medicines, foodstuffs and beverages are examples of such goods.

Aircraft (e.g. commercial aircraft) are often required to carry one or more service trolleys or galley trolleys (hereinafter "galley trolleys") on any given flight. These galley trolleys are supplied by an air carrier or airline catering provider and are used by flight attendants onboard the aircraft for the transport of beverages, airline meals and other items during a flight. Often, one or more of these galley trolleys are refrigerated, for example, so as to prolong the life of perishable food and drink(s) and/or to ensure that it is provided in an optimum (or acceptably close to optimum) state when carried onboard an aircraft.

Currently, a galley trolley may comprise a main compartment for the storage of goods which is closed by a door and a refrigeration compartment. The main compartment may be provided with plural pairs of vertically spaced runners to support trays slidably located in the main compartment. Goods, e.g. food stuffs, drink and the like, are supported on the trays. The refrigeration compartment may be located at the uppermost part of the trolley, above the main compartment. The trolley may be refrigerated through the use of blocks of solid carbon dioxide ("dry ice"). The blocks of dry ice may be loaded into the refrigeration compartment of the galley trolley prior to a flight. Typically, a galley trolley requires significant quantities of dry ice (which may be 1.8-2.4 kg of dry ice per trolley in the UK and perhaps over 3.5 kg in hot climates, e.g. southern Europe, Persian Gulf) provide a required or desired refrigerating effect. As the galley trolleys have to be packed with comestibles, delivered to the airport, delivered to the airplane, loaded onto the airplane and to provide cooling for the length of the flight, sufficient dry ice has to be used to ensure that the comestibles remain at the desired temperature. This requires extra dry ice (in the sense of more than would be optimally required) used to accommodate potential delays in delivery, loading, take-off, flight and so on.

Further, within an aircraft galley trolleys are stowed during take-off, landing and when not in use for the dispensation of goods. Clearly, the size and shape of the stowing points (ports or apertures) for galley trolleys are fixed when the aircraft is built or the aircraft is fitted out for service. These stowing points are typically of a standard size. Therefore, if greater capacity for dry ice is required, the capacity of the main compartment for storage of comestibles must be sacrificed.

Clearly a supplier of food to an airline, e.g. Gate Gourmet, LSG Sky Chefs (both RTM), will likely supply plural comestible-filled galley trolleys to an airport. Typically, a supplier may supply food to several airlines operating from a single airport. At a busy airport this may amount to hundreds or thousands of galley trolleys per day. In order to provide such a number of refrigerated galley trolleys it is necessary to use a significant amount of dry ice. This has its own logistical issues as dry ice typically needs to be supplied from an off-field site to the galley trolley supplier and needs to be held at an appropriate temperature to ensure that it can be used. The handling of dry ice may also necessitate the use of specialist equipment. It is known that dry ice sublimes at atmospheric temperatures. This is clearly wasteful and may be sub-optimal when the galley trolleys are located in a confined atmosphere (such as a galley on an aircraft).

Further, as the compartments for the blocks of dry ice are often located at the top of the galley trolley, items (e.g. medicines, foodstuffs and beverages) located at different positions within the galley trolley, e.g. located at the top, middle or bottom of the galley trolley, may experience different levels of cooling.

Typical food safety standards require that stored foodstuffs do not exceed a temperature of 10° C. Should the temperature exceed 10° C. then the guidelines specify that the food should be sent to waste. Clearly this is wasteful.

US2005/0193760 discloses a galley trolley for an aircraft which uses phase change materials to seek to maintain a required temperature of stored goods.

It would be desirable to provide a means for reliably and cheaply refrigerating a galley trolley for an aircraft.

STATEMENT OF INVENTION

It is therefore a first non-exclusive object of the invention to provide a trolley, e.g. a refrigerated trolley, that overcomes, or at least partially mitigates, one or more of the aforementioned issues of the prior art.

A first aspect of the invention provides a trolley, e.g. a galley trolley of an aircraft, the trolley having a housing and a compartment for the location of goods, the housing comprising walls and a door, at least one of said walls being movable between a first condition where it is proximate the compartment and a second condition where it is further from the compartment.

Advantageously, by providing a trolley in which a wall moves or is movable away from the compartment means that during cooling of the trolley the innermost surface of the wall can be cooled.

The or each movable wall may be translatable or pivotable between the first condition and the second condition. The or each movable wall may be secured or securable to at least a portion of the housing for example using a hinge, a bracket, a runner, parallelogram linkage, Sarrus linkage and so on. Preferably, the or each wall may be locked or lockable in the first condition and/or the or each wall may be locked or lockable in the second condition.

A portion of the housing may be made from a panel which may comprise a first layer and an outermost layer. The outermost layer may provide or define the outermost periphery of the housing. In an embodiment the outermost layer may be a relatively thermally insulating layer. In an embodiment the outermost layer may have a thickness of less than 20 mm, e.g. less than 15 mm, less than 12 mm, less than 8 mm or less than 6 mm, e.g. 2 to 3 mm. In an embodiment the outermost layer may be formed from or comprises a polymeric or composite material.

The outermost layer may be a carbon-fibre composite material. Advantageously, a carbon-fibre composite material may be sufficiently robust to protect the trolley whilst providing required thermal insulation.

The first layer may be made or formed from or comprise a polymeric material. The first layer may be or comprise a portion of a container or compartment. The first layer may be or may comprise a single container or compartment or the first layer may comprise a plurality of containers or compartments, e.g. 2, 3, 4, 5 or 6 or 'n' containers. The, some or each container may be identical or the, some or each container may be different, e.g. the or each container may have a different shape and/or size. The first layer or the or each compartment or container may be movable, e.g. removable, from the trolley. The first layer or the or each container may comprise a handle. The handle may be located on a first major surface of the first layer or the or each container. The handle may be located towards the top of the first layer or the or each container, e.g. located or locatable towards the top of the trolley in use, and/or the handle may be located so as to face the inner layer, when the first layer or the or each container is located within the trolley, in use, i.e. when the first layer or the or each container is located between the outer layer and the inner layer. The handle may be adjacent, e.g. flat or flush, against the first layer or the or each container, in a first position. The handle may extend, e.g. project outwardly, from the first layer or the or each container, in a second position. The trolley may comprise a portion to accommodate the handle. In an embodiment the first layer or the or each container may comprise a body having an inner volume. A phase change material may be located within the first layer or within the or each container. In an embodiment the inner volume has a phase change material located therein. A shape stable body may be located within the inner volume. A foam body, for example a phenolic or polyurethane foam body, may be located within the inner volume. The shape stable body or foam body may be porous. Phase change material may be located within the pores.

In an embodiment, one or more walls of the container may be thin and/or flexible, e.g. one or more walls of the container may be able to bend back on itself. In an embodiment the first layer or the or each container may be a bladder.

The outermost layer and/or the first layer or container of the or each wall or panel may be translatable from a first condition, adjacent the compartment of the trolley (i.e. a closed condition), to a second condition, further from the trolley (i.e. an open position).

Again, by having a wall or a portion of the wall, e.g. one or more layers of the panel of the wall, which moves away from the compartment in the second condition, the phase change material may more effectively give up any retained heat more effectively (i.e. it may be cooled faster), than if it were retained in the first condition. Advantageously, this reduces cooling times and/or increases cooling efficiency.

In an embodiment the phase change material may have a phase change temperature between −100 and 100 degrees Celsius, for example between −75 and 75 degrees Celsius, say between one of −75, −70, −65, −60, −55, −50, −45, −40, −35, −30, −25, −20, −15, −10, −5, 0 degrees Celsius to one of 75, 70, 65, 60, 55, 50, 45, 40, 35, 30, 25, 20, 15, 10, 5 degrees Celsius. The phase change materials may have a phase change temperature above +6 degrees Celsius, e.g. between +6 and +10 degrees Celsius, e.g. at +7, +8 or +9 degrees Celsius.

In an embodiment the first layer or the or each container may comprise a shape-stable means, porous material or insulative material. The shape-stable means, porous material or insulative material may be located in the inner volume. The PCM may be located in the shape-stable means, porous material or insulative material.

The panel may comprise an innermost layer. The innermost layer may define or provide at least a portion of the compartment for the location of the goods.

For example, the movable wall may comprise an outermost surface of the trolley. The movable wall may comprise an innermost (storage compartment facing) surface of the trolley. The PCM may be located between the outermost and innermost surface. The trolley may comprise an innermost (storage compartment facing) surface which is non-movable, e.g. is distinct from the movable wall. The movable wall may comprise a compartment in which PCM is located. The compartment may be removable from the movable wall or may be secured thereto, for example permanently secured thereto or be integral therewith. A surface of the compartment may provide an innermost (storage compartment facing) surface of the trolley. Alternatively, the surface of the compartment may be located or locatable adjacent a wall which provides the innermost (storage compartment facing) surface of the trolley.

In an embodiment the trolley comprises an enclosure which has an innermost layer to define the compartment.

The innermost layer may be a relatively thermally conductive layer, for example, as compared to the outermost layer of the walls and/or door. The innermost layer may have a thickness of less than 10 mm e.g. less than 6 mm, less than 5 mm, less than 4 mm, or less than 3 mm, e.g. between 1 mm and 6 mm, e.g. 2 mm or 4 mm thick. The innermost layer may be formed from metal e.g. aluminium.

An aspect of the invention provides a trolley, e.g. a galley trolley of an aircraft, the trolley comprising a housing having an outermost surface to provide the periphery of the housing and an innermost surface to define a compartment in which items are storable, at least a portion of the housing having as at least a portion of the innermost surface a relatively thermally conductive layer, and as at least a portion of the outermost surface, a relatively thermally insulating layer and a phase change material located between said relatively thermally conductive layer and the relatively thermally insulating layer.

The phase change material may be located within an intermediate layer. The intermediate layer may be or comprise a container. The intermediate layer may be formed of a single container or the intermediate layer may be formed of a plurality of containers, e.g. 2, 3, 4, 5 or 6 containers.

The outermost layer, first layer or container and/or innermost layer of the or each wall or panel may be translatable from a first condition, adjacent the compartment of the trolley (i.e. a closed condition), to a second condition, further from the trolley (i.e. an open position).

A further aspect of the invention provides a trolley, e.g. a galley trolley of an aircraft, the trolley comprising a housing, at least a portion of the housing is made from a panel, said panel having an intermediate layer and as at least a portion of an outermost surface, a relatively thermally insulating layer. The walls of the intermediate layer may encapsulate the phase change material.

The panel may further comprise, as at least a portion of an innermost surface, a relatively thermally conductive layer.

The intermediate layer (and the phase change material located therein) may be located between said relatively thermally conductive inner layer and the relatively thermally insulating outer layer.

The housing may be made from plural panels.

Advantageously, a phase change material located between said inner and outer layers avoids the need for a closable container and/or a separate compartment for receiving the phase change material. Furthermore, a phase change material located between said inner and outer layers of the or each panel (in comparison to a refrigeration compartment) allows for optimized cooling throughout the trolley (in comparison to localized or uneven cooling).

The housing may have a height, a depth and a width. The height may be greater than the depth and/or the width. The depth may be greater than the width. The housing may have a rectangular cuboidal form. Although, it is to be understood that the housing may take any suitable form, shape or dimensions which allows it to fit into the stowing point of an aircraft. For example, the housing may have a height (including wheels) below 1150 mm, e.g. 1100 mm, or between 900 mm and 1100 mm, e.g. 1030 mm. The housing may have a depth in the range 400 mm to 820 mm, e.g. 400 mm, 405 mm, 750 mm or 810 mm. The housing may have a width in the range 280 mm to 310 mm, e.g. 300 mm.

The thickness of the housing, at least a portion of the housing or at least a portion of the or each panel, may be in the range 5 mm to 20 mm, e.g. 6 mm to 12 mm, e.g. 6 mm to 8 mm. Because the outermost surface of the trolley may be formed by the outer surface of the or each panel, the walls of the housing can be thinner than prior art trolleys. Given that the storage points of aircraft are standard sizes, a thinner walled housing advantageously provides or allows for a larger interior space, allowing for more items to be housed within the trolley.

The housing may comprise one or more walls and at least one door. The or each panel may form at least part of the housing. The or each panel may form at least part of the one or more walls. The or each panel may form at least part of the at least one door. The or each panel may have an intermediate layer, a relatively thermally insulating outer layer and/or relatively thermally conductive inner layer.

The relatively thermally conductive inner layer may be formed from a metal sheet e.g. aluminium or copper. Advantageously, such a material allows for efficient heat exchange. Importantly, the density of aluminium is much less than copper ($\sim 2.7$ g/cm$^3$ compared to $\sim 8.92$ g/cm$^3$) whereas, the thermal conductivity of copper is better than aluminium ($\sim 400$ W m$^{-1}$ K$^{-1}$ compared to $\sim 238$ W m$^{-1}$ K$^{-1}$). Moreover, aluminium provides a food safe surface.

The relatively thermally conductive inner layer may comprise a first major surface and a second major surface. A first major surface of the relatively thermally conductive inner layer may form the interior surface of the trolley. Additionally or alternatively, the inner layer (e.g. the first major surface of the inner layer) may be resilient enough to hold one or more supports e.g. runners or brackets for supporting drawers and/or trays.

The intermediate layer, where present, may be formed from a polymeric material. The intermediate layer may be a blow-moulded polymer. The intermediate layer may be or comprise a portion of a container. The intermediate layer may be or may comprise a single container or the intermediate layer may be a plurality of containers, e.g. 1, 2, 3, 4, 5 or 6 or 'n' containers. The some or each container may be identical or the some or each container may be different, e.g. the or each container may have a different shape and/or size.

The intermediate layer or the or each container may be movable, e.g. removable, from the trolley. The intermediate layer or the or each container may comprise a handle. The handle may be located on a first major surface of the intermediate layer or the or each container. The handle may be located towards the top of the intermediate layer or the or each container, e.g. located or locatable towards the top of the trolley in use, and/or the handle may be located so as to face the inner layer, when the intermediate layer or the or each container is located within the trolley, in use, i.e. when the intermediate layer or the or each container is located between the outer layer and the inner layer. The handle may be adjacent, e.g. flat or flush, against the intermediate layer or the or each container, in a first position. The handle may extend, e.g. project outwardly, from the intermediate layer or the or each container, in a second position. The trolley may comprise a portion to accommodate the handle.

The relatively thermally insulating outer layer may be a polymeric (e.g. plastics or carbon fibre) or composite material (e.g. laminate or a fibre/polymer composite). Advantageously, a composite material may allow for improved robustness. The relatively thermally insulating outer layer may be a graphene/carbon fibre reinforced polymer composite or plastics material. Advantageously, such materials are fire retardant (conforming to the US-FAA heat release certification process). Furthermore, such materials are lightweight (in comparison to conventional trolleys, wherein the lower wall is typically formed of 6-7 kg metal to ensure stability of the trolley), reducing the overall weight of the trolley and/or accounting for the added mass of the phase change material.

The relatively thermally insulating outer layer may comprise a first major surface and a second major surface. A first major surface of the relatively thermally insulating outer layer may form the exterior surface of the trolley.

The second major surface of the relatively thermally conducting inner layer and the second major surface of the relatively thermally insulating outer layer may be in parallel and opposing relationship. An intermediate layer or the or each container may be located between the relatively thermally conducting layer and the relative thermally insulating layer, e.g. between the second major surface of the relatively thermally conducting inner layer and the second major surface of the relatively thermally insulating outer layer.

In an embodiment the intermediate layer or the or each container may comprise a body having an inner volume. A phase change material may be located within the intermediate layer. In an embodiment the inner volume has a phase change material located therein.

The inner layer and the outer layer may have the same thickness as each other. Alternatively, the inner layer and the outer layer may be a different thickness from each other. For example, the inner layer may be thinner than the intended outer layer. At least a portion of the inner layer may have a thickness of less than 10 mm e.g. less than 6 mm, less than 5 mm, less than 4 mm, or less than 3 mm, e.g. between 1 mm and 6 mm, e.g. 2 mm or 4 mm thick. At least a portion of the outer layer may have a thickness of less than 20 mm, e.g. less than 15 mm, less than 12 mm, less than 8 mm or less than 6 mm, e.g. 2 mm to 3 mm. In this way the innermost surface will be more thermally conductive, and heat will flow into that layer in a greater flux than it will flow into the outermost surface. Of course, in addition or instead, the innermost layer may be made from a material which has a higher thermal conductivity than the other walls. In any case, the or each panel will have a preferred heat path route.

In an embodiment of the invention there may be two side walls, an upper wall, a lower wall, a rear wall and a door. The door may provide the front wall of the trolley. Alternatively, there may be a front wall, and the door may provide the rear wall of the trolley. Additionally or alternatively, there may be a front wall and a door or a rear wall and a door. The door and wall together may close the trolley.

In an embodiment of the invention the trolley may comprise two doors. A first door may be located at a first end, e.g. the front, of the trolley (i.e. the door may replace at least a portion of the front wall of the trolley), the second door may be located at a second end of the trolley, e.g. in parallel and opposing relationship to the first door (i.e. the second door may replace at least a portion of the rear wall of the trolley).

The trolley may have one or more handles. The one or more handles may be located on the or each door. Alternatively, the one or more handles may be attached to a one or more of the walls of the trolley. For example, a first part of a handle may be attached to the first side wall and a second part of the handle may be attached to the second side wall or vice versa. The or each handle may be located on the front and/or rear of the trolley. The or each handle may be located towards the top of the trolley, i.e. towards the upper wall of the trolley.

In an embodiment, the or each door may have a handle, an attachment or attachment means and/or or a securement apparatus or securement means. The attachment or attachment means may be for example a hinge, a tab or a clip. The attachment or attachment means may be a single attachment or attachment means or the attachment or attachment means may be a plurality of attachments or attachment means, for example there may be 1 to 10 attachments or attachment means per door e.g. 1, 2, 3, 4, 5, 6, 7, 8, 9 or 10 attachments or attachment means per door. The or each attachment or attachment means may attach said door to a portion of the housing e.g. a side wall, front wall or rear wall. The or each door may be attached so as to open outwards, e.g. the or each door may have a hinged connection and/or be hingedly connected to a portion of the housing. Additionally or alternatively, the or each door may be attached so as to slide around an edge of a portion of the housing. The securement apparatus or securement means may be locked or lockable, e.g. the securement apparatus or securement means may hold and/or retain the door in position, e.g. in a closed position. For example, the securement apparatus or securement means may be a lock, a latch, a tab, a clip or a magnetic strip. The securement apparatus or securement means may be located or locatable on at least a portion of the housing to hold and/or retain the door in a closed position.

Each panel or each of the layers, e.g. the inner layer and/or the outer layer, of the housing may be formed from a single sheet. For example, a single layer may be cut which corresponds to the housing template, the sheet may then be folded to form the housing.

Alternatively, each of the inner layers and/or the outer layers of one or more portions of the housing may be formed from separate sections and subsequently joined together, e.g. welded, fused, screwed, nailed or glued, together.

Where one or more walls, e.g. side walls, are formed from a panel, the or each wall, or a portion of the or each wall, e.g. one or more layers of the or each panel, may be movable, e.g. pivotable, between a first condition (e.g. a closed position wherein the trolley forms a sealed unit) and a second condition (e.g. an open position). For example, the outer layer and/or the intermediate layer or the or each container may be translatable from a first condition, adjacent the compartment of the trolley (i.e. a closed condition), to a second condition, further from the trolley (i.e. an open condition). Opening the at least one door and/or the one or more walls may allow for improved cooling and/or improved air circulation through the trolley.

Preferably, the or each panel is formed from a relatively thermally insulating outer layer and an intermediate layer or one or more containers. Advantageously, this prevents or reduces the prospect of food contamination when the or each panel is opened, as the relatively thermally conducting inner layer remains in position, protecting the food and goods located within the trolley.

The or each movable, e.g. pivotable, wall, e.g. side walls, or a portion of the or each wall, e.g. one or more layers of the or each panel, may have attachments or attachment means and/or securement apparatus or securement means. The attachments or attachment means may be for example a hinge, a tab or a clip. The or each attachment or attachment means may attach said wall, e.g. side walls, to a portion of the housing. The or each wall, e.g. side walls, or a portion of the or each wall, e.g. one or more layers of the or each panel, may be attached or attachable so as to open, e.g. pivot, outwards, e.g. the or each wall or a portion of the or each wall may have a hinged connection and/or be hingedly connected to a portion of the housing. The securement apparatus or securement means may be locked or lockable, e.g. the securement apparatus or securement means may hold and/or retain the or each wall in position, e.g. in a closed position. For example, the securement apparatus or securement means may be a lock, a latch, a tab, a clip or a magnetic strip. The securement apparatus or securement means may be located or locatable on the wall and/or at least a portion of the housing to hold and/or retain the or each wall in a closed position.

The trolley may further comprise a peripheral lip. For example, the upper wall may have a peripheral lip extending thereabout. The peripheral lip may extend around all or part of the trolley, e.g. the peripheral lip may extend around all or part of the upper wall. For example, the peripheral lip may extend around the entirety of the upper wall, e.g. all four sides of the upper wall. Alternatively, there may be a plurality of peripheral lips, e.g. 1, 2, 3 or 4 peripheral lips. The or each peripheral lip may extend along part of the upper wall. For example, the or each peripheral lip may not extend along the entirety of each of the sides of the upper wall and/or the or each peripheral lip may extend along only 1, 2 or 3 sides of the upper wall. For example, the peripheral lip may extend along only the first and or second side of the trolley, where the upper wall contacts the side walls.

The trolley may further comprise one or more partitions. The one or more partitions may be located on the upper surface, i.e. the exterior surface, of the upper wall. The one or more partitions may be located between one or more of the peripheral lips. For example, where the upper wall comprises a peripheral lip on a first and second side of the trolley, the or each partition may extend between the first and second peripheral lips. A first partition may be located towards the front of the trolley, inboard of the edge of the upper wall. A second partition may be located towards the rear of the trolley, inboard of the edge of the upper wall.

The trolley may be compartmentalized. At least one of the compartments may be arranged to have a coolant e.g. dry ice or a phase change material located therein. The compartment may be for example a refrigeration compartment of conventional galley trolleys. The compartment may be a rebate, for example a recess or groove formed within the housing of the trolley. The compartment may be located at the uppermost part of the trolley. The compartment, e.g. rebate, recess or groove, may extend along the depth direction of the housing, i.e. it may extend from a first side of the housing to a second side of the housing, e.g. from the front wall to the rear wall.

At least one of the compartments may be a storage compartment, arranged to house items e.g. food and/or beverages. One or more receptacles, e.g. a drawer, a shelf, a basket, a container, a tray and/or any suitable alternatives capable of holding items such as food and/or beverages, may be provided in at least one of the compartments. Said storage compartments may be closed or closable by a door.

At least a portion of the or each receptacle may be integral with the housing. Additionally or alternatively, at least a portion of the or each receptacle may be movable into and/or out of the housing.

The or each receptacle may have a phase change material located therein. For example, where the receptacle is a tray, the or each tray may be filled with 200 ml to 1000 ml of phase change material, e.g. 600 ml to 800 ml of phase change material, e.g. approximately 700 ml of phase change material.

Alternatively, the or each receptacle may be a drawer. The drawer may have a first compartment and a second compartment. The main compartment may house food and/or beverages, the second compartment may have a phase change located therein. The second compartment may be located or locatable within the main compartment or the second compartment may be located or locatable below the main compartment.

Where the receptacle is integral with at least a portion of the housing, the receptacle may be formed of the same material and/or have the same properties as the inner layer of the housing.

The or each receptacle may be blow moulded. The or each receptacle may have a thickness in the range 2 mm to 8 mm, e.g. 4 mm.

The or each receptacle may be positioned on one or more supports. The or each receptacle may be movable with or on the said supports. For example, the or each receptacle may slide on or off the supports, or the or each receptacle may releasably engage with the supports e.g. the or each receptacle may be on runners. Alternatively, the or each receptacle may be rigidly secured, securable or integral with the one or more portions of the housing, e.g. the side walls and/or rear wall of the housing, to the one or more supports.

The or each support may be for example a runner, a bracket, a rod, a strut, a bar, a block, a ledge, a formation or any suitable alternative that allows for support of an object, e.g. a receptacle. The or each support may be formed from any suitable material e.g. plastics material, wood or metal. There may be one support per receptacle or there may be more than one support per receptacle e.g. two supports, four supports, five supports or six supports per receptacle. The supports may be located in parallel and/or in pairs. Preferably, the or each support is located or locatable on the first major surface (i.e. the inside surface) of at least a portion of the housing. The plurality of supports may be distributed along the direction perpendicular to the upper and/or lower walls. Where the supports are not integral with the housing, the or each support may be nailed, glued or screwed to the housing.

The trolley may be portable i.e. the trolley may comprise wheels. The wheels may be located or locatable on the lower wall i.e. the outer surface (e.g. the first major surface) of the lower wall. In an embodiment, four wheels may be provided, a wheel on each corner of the lower wall.

In an embodiment of the invention the wheels may be Shark Wheel® Pallet Jack Wheels (from https://sharkwheel-.com) or any alternate wheels that allow for improved stability of the trolley. Advantageously, having wheels which help with stability allows for a lighter weight material to be used for one or more portions of the housing, e.g. the base portion of the housing (which in conventional galley trolleys is typically formed of a 6-7 kg metal).

Additionally or alternatively, having wheels which help with stability mitigates, or at least partially mitigates, the problems associated with having a top-heavy or fully loaded trolley. For example, the provision of stability enhancing wheels reduces the possibility of the trolley tilting and/or tipping-over, e.g. when the trolley collides with an object or runs over debris.

In an embodiment the wheels may be provided with a pedal break and/or a break release pedal. The pedal break and/or break release pedal may be positioned at a front end of the trolley or a rear end of the trolley. The pedal break and/or the break release pedal may be located below the lower wall.

The phase change material may be a solid-liquid phase change material. The phase change material may be configured to transition between solid and liquid states at the phase change temperature.

The phase change material may have a phase change temperature or melting temperature between −100° C. and +100° C., for example between −75° C. and +75° C.

The or each receptacle may be a refrigerated member. In embodiments, the phase change material may have a phase change temperature or melting temperature of less than 0° C.

The phase change material may have a phase change temperature or melting temperature of between 0° C. and −80° C., for example between 0° C. and −70° C., between 0° C. and −60° C., between 0° C. and −50° C., 0° C. and −40° C., between −5° C. and −75° C., between −10° C. and −70° C.

Alternatively, the phase change material may have a melting or phase change temperature above 0° C. The phase change material may have a phase change temperature or melting temperature between 0° C. and +100° C., for example between +10° C. and +90° C., between +20° C. and +80° C.

In an embodiment of the invention at least a portion of the phase change material may have a phase change temperature or melting temperature, above +6° C., e.g. between +6° C. and +10° C., e.g. at +7° C., +8° C. or +9° C. The core temperature within the trolley is unlikely to exceed +10° C., as the latent heat of the construction material absorbs the heat, lowering the core temperature of the items. This is advantageous as the storage temperature falls within the limits of the food safety standards.

Preferably, the phase change temperature is +4° C. to +5° C. higher than the temperature of a fridge (e.g. +3° C. to +5° C.). The phase change material may remain in a first state, e.g. a frozen or solid state, below the melting or phase change temperature. For example, the phase change material may remain in a 'frozen/solid' state below +6° C. e.g. at +5° C., +4° C. or +3° C.

The phase change material may comprise a eutectic solution. Additionally or alternatively, the phase change material may be or comprise an organic phase change material, e.g. a bio-based, paraffin, eutectic or carbohydrate derived phase change material. The phase change material may be or comprise an inorganic phase change material, e.g. a compound, aqueous salt solution, salt and/or a salt hydrate-based phase change material. The phase change material may be or comprise an inorganic eutectic phase change material.

The phase change material may be encapsulated, e.g. microencapsulated, in spherical or tubular capsules. The intermediate layer or the or each container or the receptacles may comprise a plurality of capsules, e.g. spherical or tubular capsules, having a phase change material encapsulated within.

Creating a fluid tight seal may involve fusing together the inner layer and outer layer, or it may involve utilizing a snap fit arrangement or incorporating one or more gaskets and/or sealing agents.

The or each panel, the or each receptacle, the or each portion of the housing and/or the or each intermediate layer (e.g. between the second major surface of the inner layer and the second major surface of the outer layer) or the or each container may be insulated, e.g. comprise an insulative material, a stable-shape means and/or a porous material. Advantageously, an insulative material, e.g. an insulative foam, may allow for structural rigidity.

The phase change material may be at least partially located within, integrated, received within or absorbed into pores or spaces of the shape-stable means, porous material or insulative material. The intermediate layer or the or each container or receptacle may comprise a layer of insulative foam or aerogel. The layer of insulative foam or aerogel may be located between or interstitially of a wall or periphery of the intermediate layer or the or each container or receptacle and the phase change material. The intermediate layer or the or each container or receptacle may comprise an insulated side and a non-insulated side. A major or minor proportion of the intermediate layer or the or each container or receptacle may be taken up by the phase change material.

Prior to use the temperature of the phase change material may be reduced i.e. to transition at least a portion of the phase change material from a first state to a second state. Advantageously, reducing the temperature of the phase change material does not comprise any differing techniques to the standard/conventional method of preparing a trolley, comprising perishable items, for an aircraft. For example, the trolley may be placed in a cold store for a period of time, e.g. between 6 and 12 hours. The cold store may be for example a ~+3° C. to +5° C. cold store, e.g. a ~+4° C. fridge. The trolley may be placed in a cold store when it is not required e.g. overnight.

The at least one door of the trolley may be opened fully or partially, when the trolley is located in the cold store. Advantageously, opening the door may further reduce the core temperature of the trolley. For example, where a room temperature trolley is placed in a cold store as a sealed unit, i.e. the door is closed, the core temperature of the trolley may fall to ~6.5° C., after being left in the cold store for 12 hours. In comparison, opening the door of the trolley allows the core temperature of the trolley to reach ~4° C.

Additionally or alternatively, where the trolley comprises pivotable walls (e.g. side walls movable between a first condition, e.g. a closed position, and a second condition, e.g. an open position), one or more of the walls, e.g. side walls, or a portion of the one or more walls, e.g. one or more layers of the or each panel forming the or each wall, may be opened (fully or partially) when the trolley is placed in the cold store. Advantageously, opening at least one of the walls, e.g. side walls, or a portion of the one or more walls, e.g. one or more layers of the or each panel forming the or each wall, may reduce the core temperature of the trolley from room temperature to ~3-5° C., e.g. ~3-4° C. in less than 12 hours, e.g. 4 to 9 hours, 4 to 8 hours or 6 to 8 hours.

Advantageously, opening one or more of the walls or a portion of the one or more walls, e.g. one or more layers of the or each panel forming the or each wall (wherein said wall is formed from a panel comprising a relatively thermally insulating outer layer and an intermediate layer or container), instead of the at least one door of the trolley, means there is no or reduced risk that the food may become contaminated, as the food is still protected by the relatively thermally conducting inner layer, which remains in position.

Advantageously, where the wall, e.g. the intermediate layer or the or each container, comprising the phase change material is exposed during cooling it may allow for faster cooling without an increase in storage size. Further, this may allow for items located in the trolley, and in particular items located within the middle of the trolley, to be kept cooler for longer periods.

Accordingly, a further aspect of the invention provides a method of cooling a trolley having one or more walls, a door and a compartment for storing goods, the method comprises moving at least one of the walls from a first condition, where said at least one wall is proximate the compartment to a second condition where said at least one wall is further away from the compartment and locating the trolley in an environment which is at a below ambient temperature.

Leading up to the flight the trolley may be stocked up with food, beverages, medicaments and/or other required items, i.e. the items are located within the trolley proximate the phase change material, wherein the phase change material is located or locatable in a panel or at least a portion of the housing (e.g. the intermediate layer or the or each container) and/or the receptacles.

After loading of items, the trolley may subsequently be returned to the cold store. The trolley may then be transported to the required location e.g. the trolley may be transported in a refrigerated vehicle to an awaiting aeroplane. When the trolley is removed from the final refrigerated location, e.g. the cold store or the refrigerated vehicle, the phase change material may keep the core temperature of the items located on the trolley cool, e.g. at or below +6° C., +5° C. or +4° C., for approximately four to nine hours, e.g. four to eight hours, four to seven hours or four to six hours. After this period of time has elapsed the core temperature of the items located within the trolley may begin to increase, e.g. to above +7° C. e.g. +8° C., +9° C. or +10° C.

The trolley of this invention is capable of keeping the items located on or within the receptacles cool for short periods of time e.g. up to four to six hours. This makes such a trolley ideal for short flights, wherein the items are only required to be cooled up to a period of four to six hours.

After use, the trolley may be unloaded and/or cleaned. The trolley may then be returned to a cold store prior to re-use. The trolley typically has wheels or casters to facilitate motion, e.g. rolling motion.

Advantageously, the trolley of this invention is a portable refrigeration unit. The phase change material may be located within a panel, within a portion of the housing and/or within a receptacle, allowing for uniform cooling of or within the trolley. Furthermore, this trolley has additional advantages in that it has increased structural rigidity.

Where the trolley comprises an intermediate layer or one or more containers, the or each intermediate layer or the or each container, may be removed or removable from the trolley, after use. The or each intermediate layer or the or each container, may be movable, e.g. detached or detachable from the trolley and/or the outer layer.

When it is desired to remove the or each intermediate layer or the or each container, from the trolley, the trolley may first be positioned into the second condition by pivoting outwardly the or each wall, e.g. the side walls, or a portion of the or each wall, e.g. one or more layers of the or each panel forming the or each wall.

With the trolley in the second position, the or each intermediate layer or the or each container, may be accessible. The operator may first lift the or each intermediate layer or the or each container, in an upwards direction. The operator may then move the or each intermediate layer or the or each container, in a direction towards the rear or front of the trolley.

When, the or each intermediate layer or the or each container, has been removed from the trolley the handle of the or each intermediate layer or the handle of the or each container, may be moved from a first position, where the or each handle is adjacent, e.g. flat or flush, against the intermediate layer or container, to a second position, where the or each handle may extend, e.g. project outwardly, from the intermediate layer or container.

Alternatively, the or each handle may be moved from a first condition to a second condition prior to removing the or each intermediate layer or the or each container, from the trolley. Advantageously, the one or more handles may help the operator in moving, e.g. removing, the intermediate layer or the or each container, from the trolley.

Advantageously, once removed from the trolley, the or each intermediate layer or the or each container, may be stored on the trolley itself. For example, the or each intermediate layer or the or each container, may be hung on the peripheral lip of the upper wall of the trolley, when the trolley is in a first condition, i.e. when the walls of the trolley, e.g. the outer layer is adjacent the cavity. The or each intermediate layer or the or each container, may be hung on the peripheral lip of the upper wall of the trolley by the handle of the or each intermediate layer or the or each container, i.e. when the handle is in a second, extended position.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. For the avoidance of doubt, the terms "may", "and/or", "e.g.", "for example" and any similar term as used herein should be interpreted as non-limiting such that any feature so-described need not be present. Indeed, any combination of optional features is expressly envisaged without departing from the scope of the invention, whether or not these are expressly claimed. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE FIGURES

Embodiments of the invention will now be described by way of example only with reference to the accompanying drawings in which.

SPECIFIC DESCRIPTION

Figure 1A:
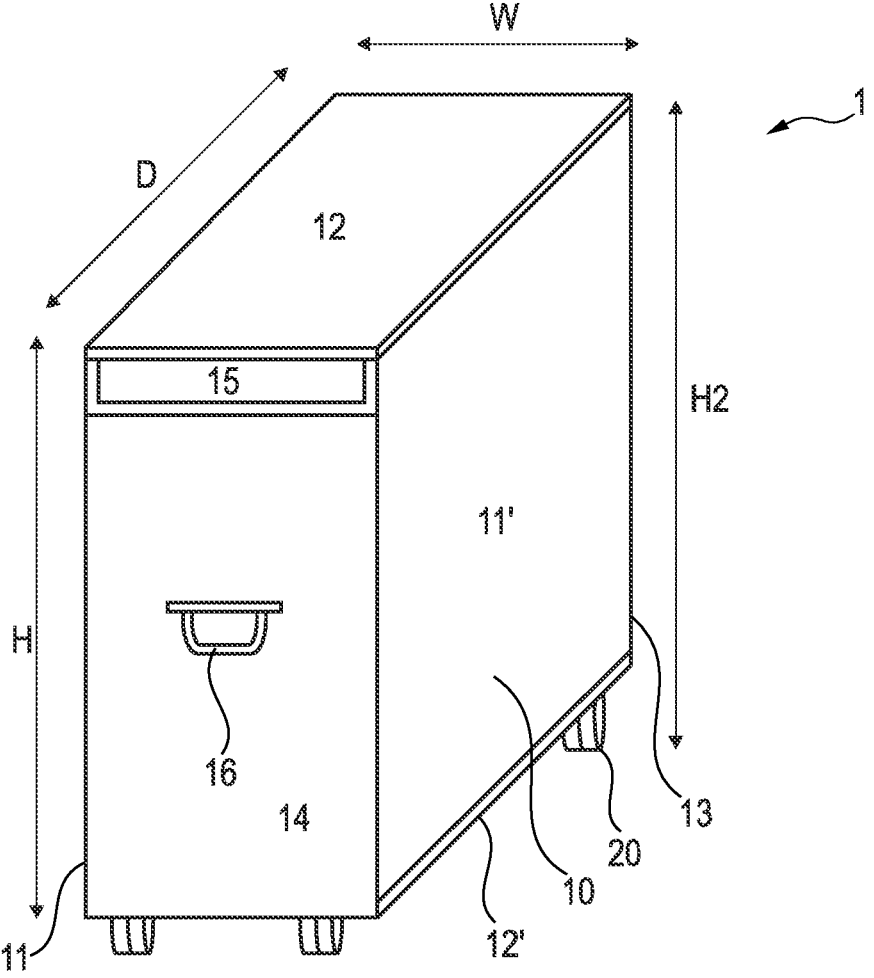
FIGS. 1A, 1B and 1C are perspective views of a trolley according to an embodiment of the invention.
Figure 1B:
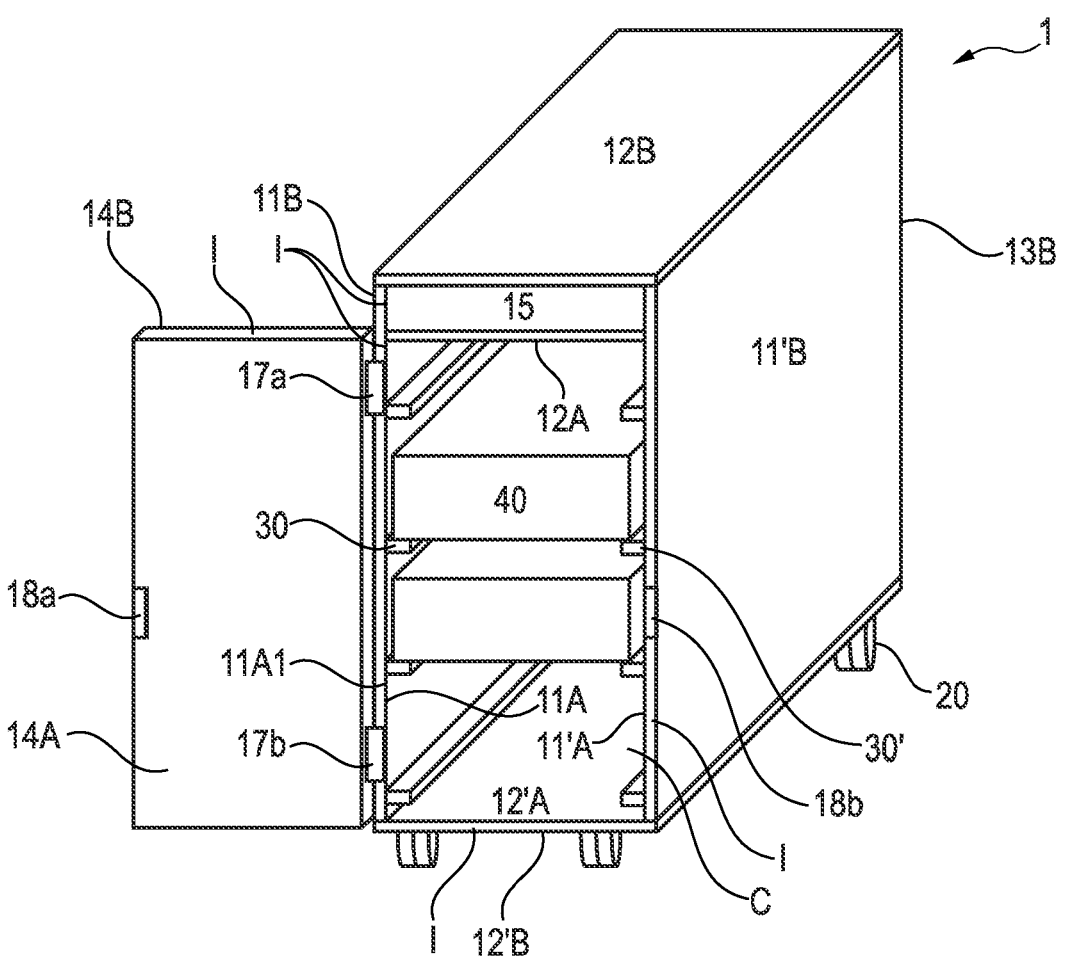
Figures 1C, 1D, 1E:
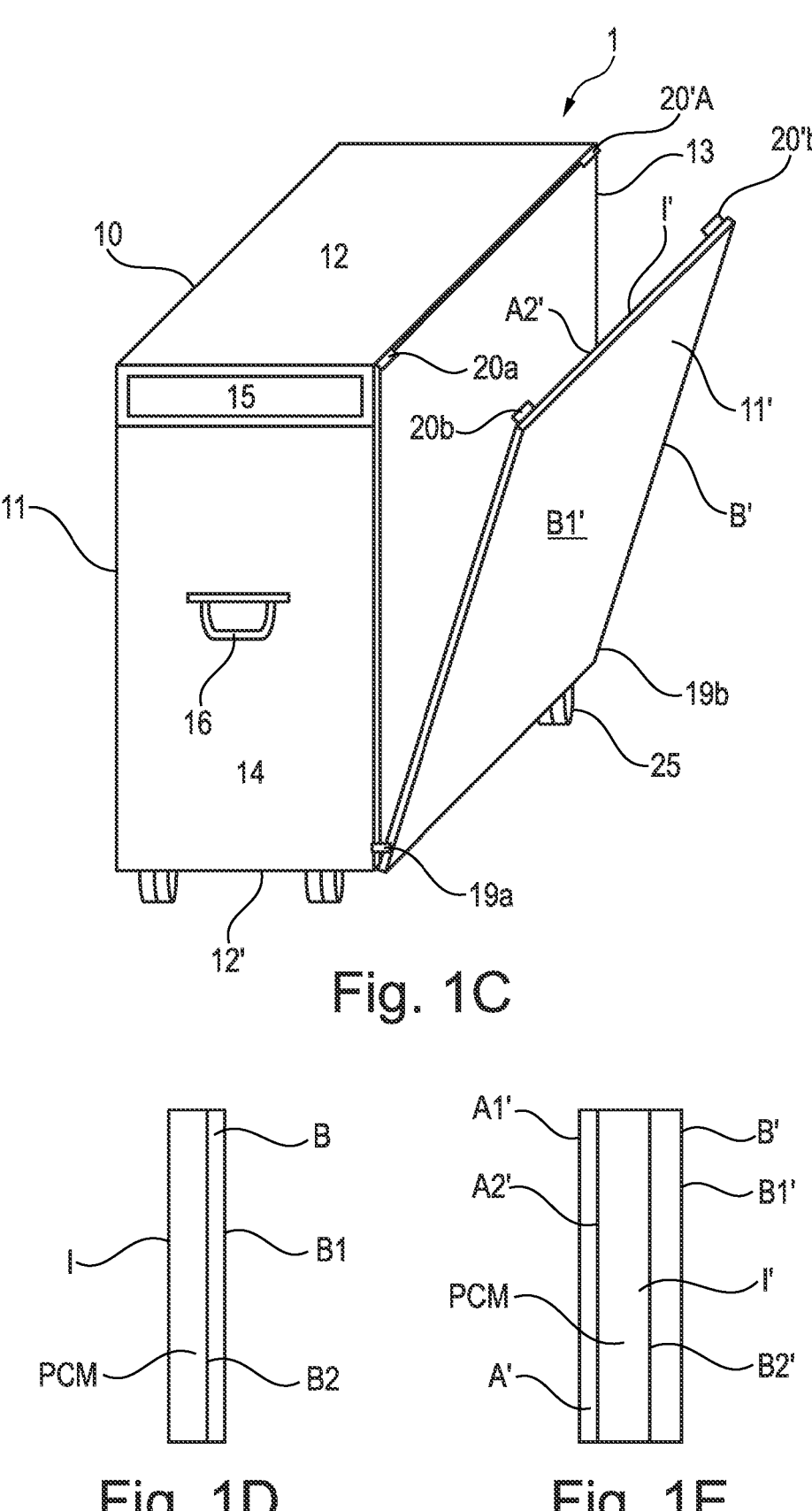
FIGS. 1D and 1E are cross-sectional views through a panel according to embodiments of the invention.

Referring now to FIGS. 1A to 1C, there is shown a trolley 1, e.g. a galley trolley of an aircraft, according to an embodiment of the invention.

The trolley 1 has a housing 10, wheels 20, a compartment C in which is provided a plurality of supports 30, 30' and a plurality of receptacles 40. The housing 10 comprises opposing side walls 11 and 11', an upper wall 12, a lower wall 12', a rear wall 13, a door 14 and rebate 15.

In this embodiment the door 14 provides the front wall of the housing.

At least a portion of the one or more of the side walls 11, 11', upper wall 12, lower wall 12', rear wall 13 and/or the door 14 may have the same thickness as each other. Alternatively, at least a portion of the one or more of the side walls 11, 11', upper wall 12, lower wall 12', rear wall 13 and/or the door 14 may have a different thickness to each other. For example, the lower wall 12' may be thicker than the upper wall 12, rear wall 13, door 14 and/or the side walls 11, 11', or the lower wall 12' may be thinner than the upper wall 12, rear wall 13, door 14 and/or the side walls 11, 11'. The thickness of each wall may be in the range 5 mm to 20 mm, e.g. 6 mm to 12 mm or 6 mm to 7 mm.

The housing 10 has a rectangular cuboidal form. The housing 10 has a height H, a depth D and a width W. The height H is greater than the depth D, which is greater than the width W. It is to be understood that the trolley 1 may take any suitable form, shape or dimensions which allows it to fit into the stowing point of an aircraft. In this embodiment the height H of the housing 10 is ~926 mm, the depth D is ~405 mm and the width W is ~301 mm. The height H2 of the trolley 1, including the wheels, is ~1030 mm.

Each of the side walls 11, 11', upper wall 12, lower wall 12', rear wall 13 and/or the door 14 of this embodiment may be formed or may comprise a panel. The or each panel may have a thickness in the range 5 mm to 20 mm, e.g. 6 mm to 12 mm, e.g. 6 mm to 8 mm.

Each panel may comprise an outer layer B and an intermediate layer I (see FIG. 1D). The or each panel may further comprise an inner layer A' (see FIG. 1E).

The outer layer B, B' may have an outermost major surface B1, B1' and an innermost major surface B2, B2', the innermost major surface being adjacent the intermediate layer, I, I'.

The inner layer A' may be made formed from metal materials, for example aluminium or aluminium alloys. At least a portion of the inner layer A' may have a thickness of less than 10 mm, e.g. less than 6 mm, less than 5 mm, less than 4 mm or less than 3 mm, e.g. between 1 mm and 6 mm, e.g. 2 mm or 4 mm thick. The inner layer A' may comprise a first major surface A1' and a second major surface A2'. The first major surface A1' of the relatively thermally conducting inner layer A' may form the interior surface of the trolley.

Alternatively, the trolley may comprise a carcass, e.g. a metal carcass, which provides the compartment C. The panel of FIG. 1D may be usable with a trolley having a carcass, e.g. a metal carcass, such that the intermediate layer I is located adjacent the carcass.

The outer layer B, B' may be a polymeric/composite material e.g. laminate or a fibre/polymer composite. At least a portion of the outer layer B, B' may have a thickness of less than 20 mm, e.g. less than 15 mm, less than 12 mm, less than 8 mm or less than 6 mm e.g. 2 mm to 3 mm.

The intermediate layer I, I' may be formed from a polymeric material. The intermediate layer I, I' may be a blow-moulded polymer. The intermediate layer I, I' may comprise a inner volume in which is located a phase change material PCM.

The second major surface A2' of the inner layer A' and the second major surface B2' of the outer layer B' of the or each portion of the housing may be in parallel and opposing relationship. An intermediate layer I' may be located between the inner layer A' and the outer layer B' of the or each portion of the housing, as shown for side wall 11' in FIG. 1C.

The inner layer A' and the outer layer B' may have the same thickness as each other. Alternatively, the inner layer A' and the outer layer B' may be a different thickness from each other. For example, the intended innermost surface (inner layer A') may be thinner than the intended outermost surface (outer layer B'). In this way the innermost surface A' will be more thermally conductive, and heat will flow into that layer in a greater flux than it will flow into the outermost surface B'. Of course, in addition or instead, the innermost layer A' may be made from a material which has a higher thermal conductivity than the other walls. In any case, the or each panel will have a preferred heat path route.

The upper wall 12 of the housing 10 is in parallel and opposing relationship to the lower wall 12' i.e. the inner layer (e.g. the first major surface of the inner layer) of the upper wall 12A is facing the inner layer (e.g. the first major surface of the inner layer) of the lower wall 12'A. When the door 14 is shut, the rear wall 13 is in opposing and parallel relationship to the door 14 i.e. the inner layer (e.g. the first major surface of the inner layer) of the rear wall 13A is facing the inner layer (e.g. the first major surface of the inner layer) of the door 14A.

Side walls 11, 11' extend between the upper wall 12 and the lower wall 12'. The rear wall 13 extends between the upper wall 12 and the lower wall 12'. The door 14 extends between the lower wall 12' and the wall of the rebate 15.

The rebate 15 (e.g. the refrigeration compartment) may extend along the depth D of the trolley 1, i.e. the rebate 15 may extend from a first side to a second side, wherein the second is the rear wall 13 and the first side is the side comprising the door 14. The rebate 15 may house a coolant e.g. dry ice.

Referring now to FIG. 10, side wall 11' is hingedly connected to the housing. The side wall 11' comprises a retainer or retainment means 19a, 19b and a lock, lock means or securement apparatus or securement means 20a, 20'a, 20b, 20'b. Attachment or attachment means 19 may be, for example, a chain, rope or clip arranged to limit the movement of the side wall 11'.

In a first condition (FIGS. 1B, 1C) the side wall 11' will be adjacent the compartment C and will be secured or securable in place against motion by engaging mutually engaging portions of the lock, lock means or securement apparatus or securement means 20a, 20'a, 20b, 20'b.

When it is desired to place the trolley in the second condition, the wall 11' is opened, e.g. pivoted outwardly away from the compartment C about the hinge connection, by first disengaging the mutually engaging portions of the lock, lock means or securement apparatus or securement means 20a, 20'a, 20b, 20'b and allowing or causing the wall 11' to pivot away from the compartment C.

Motion of the wall 11' is arrested by the retainer or retainment means 19a, 19b.

The lock, lock means or securement apparatus or securement means 20, 20' may be a lock, a latch, a tab, a clip or a magnetic strip. The securement apparatus or securement means 20, 20' may be located or locatable on at least a portion of the housing to hold and/or retain the or each wall in a closed position. In this embodiment a first portion of the securement apparatus or securement means 20a, 20'a is located or locatable on the housing, e.g. the upper wall of the housing 12 and a second portion of the securement apparatus or securement means 20b, 20'b is located or locatable on the wall, e.g. the side wall 11'.

A phase change material PCM is located in the intermediate layer I, I' between each of the inner layer A, A' and outer layer B, B' of one or more of the side walls 11, 11', upper wall 12, lower wall 12', rear wall 13 and/or the door 14.

The door in this example has a handle 16. When the door 14 is shut the trolley 1 is a closed unit. The door may be attached to one or more of the side walls 11, 11', upper wall 12 or lower wall 12' by one or more attachments or attachment means 17. In this example the door 14 is attached to the first side wall 11 by two attachments or attachment means 17a and 17b. The one or more attachments or attachment means 17 may be for example a hinge, a tab or a clip. For example, the door may have a hinged connection, e.g. the door may be hingedly connected to one or more of the side walls 11, 11', upper wall 12 or lower wall 12'. The door 14 may be attached so as to open outwards, or the door 14 may be attached so as to slide around the edge of one of the side walls 11, 11'.

The door 14 may further comprise a securement apparatus or securement means 18, to hold the door 14 in a shut position. The securement apparatus or securement means may be for example a latch, a tab, a clip and/or a magnetic strip. A first portion of the securement apparatus or securement means 18a is located or locatable on the door 14, a second portion of the securement apparatus or securement means 18b is located or locatable on the second side wall 11'.

There are further provided a plurality of wheels 25. The wheels may be castering wheels or Shark Wheel® Pallet Jack Wheels. In this embodiment, there are four wheels 20. However, it is to be understood that there may be less than four wheels 25 e.g. three wheels. Alternatively, there may be more than four wheels 25 e.g. six wheels. The wheels 25 of this embodiment are located or locatable on the outer surface of lower wall 12'. A plurality of wheels 25 are provided for easy transportation of the trolley 1. In this example the wheels 25 are located or locatable, on the exterior face of the lower wall 12', adjacent each of the corners.

Turning to the supports 30, 30', in this embodiment the plurality of supports 30, 30' are rectangular ledges. However, the plurality of supports 30, 30' may take any form which allows support of an object e.g. a receptacle 40. The supports 30, 30' may be formations which are integral with the side walls of the housing 11, 11' or they may be separate from the side walls of the housing 11, 11'. The supports 30, 30' may be for example a bracket, a block, a strut, a rod, a bar or a drawer slide or runner. The supports 30, 30' may be formed of any suitable material, for example metal, plastic or wood. In this example there are two supports 30, 30' for each receptacle 40. However, there may be less than two supports 30 per receptacle 40, e.g. a single support 30 may be provided for each receptacle 40, or there may be more than two supports 30 provided per receptacle 40, e.g. four supports. In an embodiment, supports 30 are located in parallel and/or in pairs.

With the panel of FIG. 1E, the supports 30 may be mounted to the first major surface A1' of the inner layer A of the panel.

With other panels, for example that shown in FIG. 1D, the carcass provides or defines the compartment C and the supports 30 will be located within the carcass.

The supports 30, 30' may be nailed, glued, screwed or attached or attachable by any suitable alternative in place.

Each receptacle 40 is positioned on said one or more supports 30, 30'. In this embodiment each receptacle 40 is located or locatable on an opposing pair of parallel supports 30, 30'. The receptacles 40 may be movable with or on the supports 30, 30'. For example, the or each receptacle 40 may slide on or off the supports 30, 30', or the or each receptacle 40 may be releasably engaged with the supports 30, 30' e.g. the or each receptacle 40 may be on drawer runners 30. Alternatively, the or each receptacle 40 may be rigidly secured or securable to the supports 30, 30' or the or each receptacle 40 may be integral with the housing.

The plurality of receptacles 40 may be a tray, a basket or any suitable alternative capable of holding items e.g. food, beverages and/or medicaments. Further, the or each receptable may comprise or define a sealed cavity for receiving a phase change material therein.

Figures 2A, 2B, 2C:
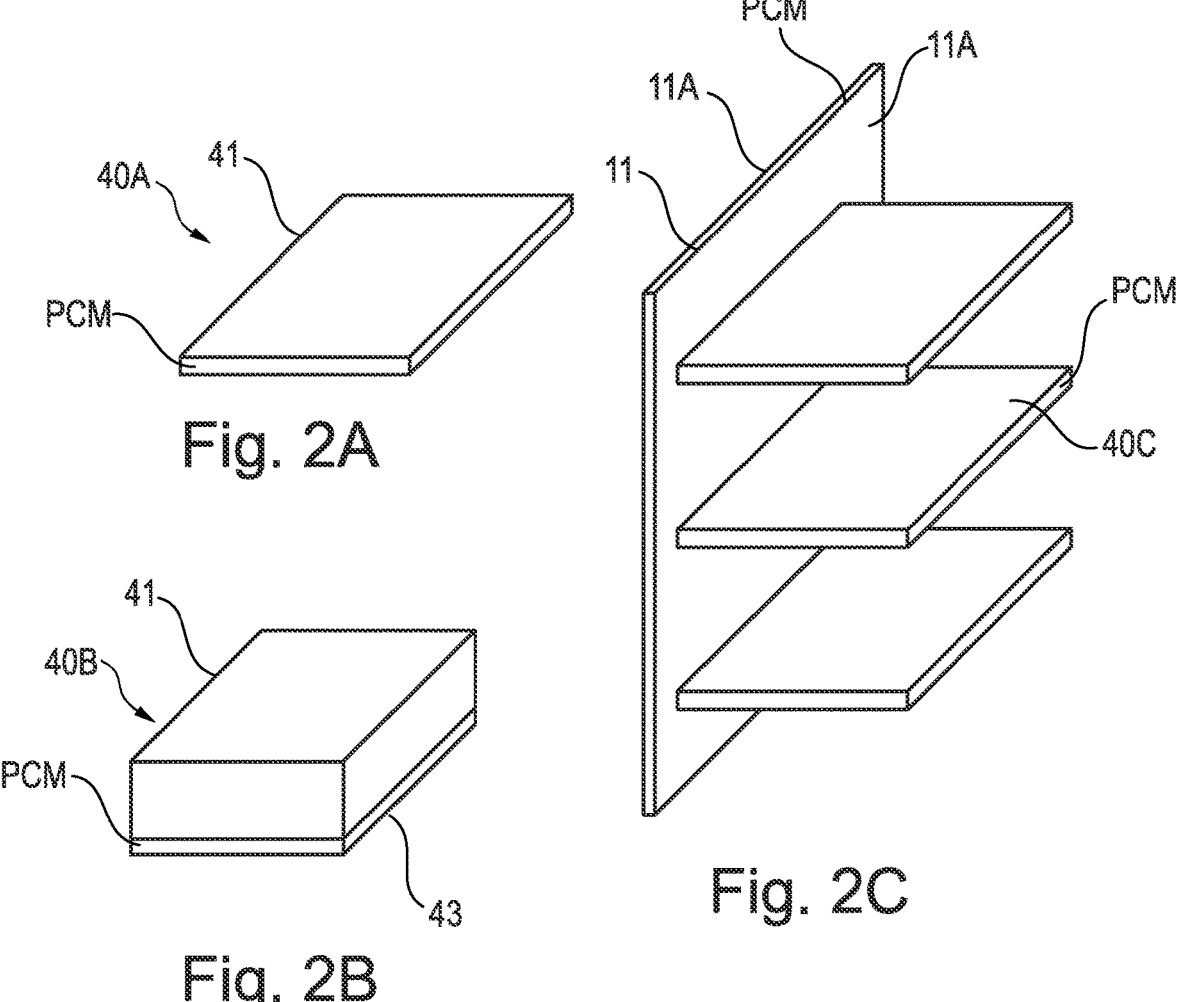
FIGS. 2A to 2C are perspective views of receptacles of the invention.

Referring now to FIGS. 2A, 2B and 2C, there are shown receptacles 40 according to embodiments of the invention.

In an embodiment the receptacle may be a tray 40A as shown in FIG. 2A. The receptacle 2A may have a phase change material PCM located therein. For example, approximately 700 ml of phase change material PCM, may be located within the tray 40A.

In an alternate embodiment the receptacle 40 may be a drawer 40B, as shown in FIG. 2B. The drawer 40B may have a main compartment 42 and a second, separate compartment 43. The main compartment 42 may house items e.g. food and/or beverages. The second, separate compartment 43 may have a phase change material located therein. The second compartment 43 may be located or locatable within the first compartment 42 or it may be outside and/or attached or attachable to the first compartment 42.

In a further embodiment the receptacle 40C may be integral with at least a portion of the housing. The receptacle 40C may be formed of the same material or have the same properties, as the inner layer A of one or more of the side walls 11, 11', upper wall 12, lower wall 12', rear wall 13 and/or the door 14. In this embodiment the receptacle 40C is integral with side wall 11. A phase change material may be located within the receptacle 40C.

The or each receptacle 40 may be blow moulded. The or each receptacle 40 may have a 2 mm to 8 mm thickness throughout, e.g. a 4 mm thickness throughout.

The or each receptacle 40 may be insulated, e.g. comprise an insulative material (e.g. an insulative foam), a stable-shape means and/or a porous material. The phase change material PCM may be at least partially located within, integrated, received within or absorbed into pores or spaces of the shape-stable means, porous material or insulative material.

Where the or each receptacle 40 is not integral with the housing 10 of the trolley 1, the or each receptacle 40 may comprise runners allowing for them to be removably located or locatable within the trolley 1.

Referring now to FIGS. 1 and 2, the phase change material PCM of this invention may be a solid-liquid phase change material. The phase change material PCM may be located within the intermediate layer I, I' of the or each portion of the housing and/or within the or each receptacle 40, e.g. within the sealed cavity of the or each receptacle 40.

The phase change material PCM may be configured to transition between solid and liquid states at the phase change temperature. In this embodiment the phase change material PCM has a melting or phase change temperature above 0° C., for example the phase change material PCM may have a melting or phase change temperature above +7° C., e.g. between +7° C. and +10° C., e.g. at +8° C. or +9° C. The phase change material PCM may remain in a first state, e.g. a frozen or solid state, below the melting or phase change temperature. For example, the phase change material PCM may remain in a 'frozen/solid' state below +7° C. e.g. at +6° C., +5° C., +4° C. or +3° C.

The phase change material PCM may comprise a eutectic solution. Additionally or alternatively, the phase change material PCM may be or comprise an organic phase change material, e.g. a bio-based, paraffin, eutectic or carbohydrate derived phase change material. The phase change material PCM may be or comprise an inorganic phase change material, e.g. a compound, aqueous salt solution, salt and/or a salt hydrate-based phase change material. The phase change material PCM may be or comprise an inorganic eutectic phase change material.

The phase change material PCM may be encapsulated, e.g. microencapsulated, in spherical or tubular capsules. The intermediate layer I or receptacle 40 may comprise a plurality of capsules, e.g. spherical or tubular capsules, having a phase change material PCM encapsulated within.

The or each panel, the or each portion of the housing, the or each intermediate layer I, I' and/or the or reach receptacle 40 may further comprise a shape-stable means, porous material and/or insulative material. The phase change material may be at least partially located within, integrated, received within or absorbed into pores or spaces of the shape-stable means, porous material or insulative material. The intermediate layer I, I' or receptacle 40 may comprise a layer of insulative foam or aerogel. The layer of insulative foam or aerogel may be located between or interstitially of a wall or periphery of the intermediate layer I, I' or receptacle 40 and the phase change material. The intermediate layer I, I' or receptacle 40 may comprise an insulated side and a non-insulated side. A major or minor proportion of the intermediate layer I, I' or receptacle 40 may be taken up by the phase change material.

Referring now to FIGS. 4A to 4E, there is shown a trolley 2, e.g. a galley trolley of an aircraft, according to a further embodiment of the invention.

The trolley 2 is similar to the trolley 1 of FIGS. 1A to 10. Like features are depicted with like reference numerals with the prefix '2' and will therefore not be described further herein.

The trolley 2 of this embodiment has a housing 210, wheels 220, and a compartment 2C.

The trolley 2 of this embodiment is absent the rebate 15 (e.g. the refrigeration compartment) of trolley 1.

The housing 210 comprises opposing side walls 211 and 211', an upper wall 212, a lower wall 212', a first door 214 and a second door 214'. In this embodiment the first door 214 provides the front wall of the housing and the second door 214' provides the rear wall of the housing 210. The second door 214' is in parallel and opposing relationship to the first door 214.

The side walls 211, 211' extend between the lower wall 212' and the upper wall 212. Each of the doors 214, 214' extend between the lower wall 212' and the upper wall 212.

In this embodiment the upper wall 212 has peripheral lips 221a, 221b. Each of the peripheral lips 221a, 221b extend along the length of the upper wall L'. The first peripheral lip 221a extends along the first side of the trolley, where the upper wall 212 contacts the first side wall 211. The second peripheral lip 221b extends along the second side of the trolley, where the upper wall 212, contacts the second side wall 211'.

The trolley further comprises partitions 224a, 224b. The partitions 224a, 224b are located on the upper surface, i.e. the exterior surface, of the upper wall 212. The partitions 224a, 224b are arranged perpendicular to the peripheral lips 221a, 221b. The partitions 224a, 224b are located between the peripheral lips 221a, 221b. The first partition 224a is located towards the front of the trolley, inboard of the edge of the upper wall 212. The second partition 224b is located towards the rear of the trolley, inboard of the edge of the upper wall 212.

The first door 214 is identical to the second door 214'. However, it is to be understood that the first door 214 may be different to the second door 214'.

When the doors 214, 214' are shut the trolley 2 is a closed unit. The doors 214, 214' may be attached to one or more of the side walls 211, 211', upper wall 212 or lower wall 212' by one or more attachments or attachment means 217a to 217e and 217a' to 217e'. In this example the first door 214 is attached to the first side wall 211 by five attachments or attachment means 217a to 217e and the second door 214' is attached to the second side wall 211' by five attachments or attachment means 217a' to 217e'. The or each attachment or attachment means 217, 217' may be for example a hinge, a tab or a clip. For example, the doors 214, 214' may have a hinged connection, e.g. the doors 214, 214' may be hingedly connected to one or more of the side walls 211, 211', upper wall 212 or lower wall 212'. The doors 214, 214' may be attached so as to open outwards, or the doors 214, 214' may be attached so as to slide around the edge of one of the side walls 211, 211'.

The doors 214, 214' may further comprise a securement apparatus or securement means, to hold the doors 214, 214' in a shut position. The securement apparatus or securement means may be for example a latch, a tab, a clip and/or a magnetic strip. A first portion of the securement apparatus or securement means may be located or locatable on each of the first and second doors 214, 214', a second portion of the securement apparatus or securement means may be located or locatable on one or more of the side walls 211, 211'. In this embodiment the securement apparatus or securement means are locks 218, 218', in the form of a latch, provided on each of the doors 214, 214'.

In this embodiment there are two handles 216, 216'. The first handle 216 is located at the front of the trolley, on the same side of the trolley as the first door 14. The second handle 216' is located at the rear of the trolley, on the same side as the second door 14'. Each of the handles 216, 216' are located towards the top of the trolley, i.e. towards the upper wall 212 of the trolley 2. A first part of the handle 216 is attached to the first side wall 211 and a second part of the handle 216 is attached to the second side wall 212'. A first part of the handle 216' is attached to the second side wall 211' and a second part of the handle 216' is attached to the first side wall 212.

In this embodiment the wheels 220 are provided with a pedal break 222 and a break release pedal 223. The pedal break 222 and break release pedal 223 are positioned at a front end of the trolley 2, below the lower wall 12'.

Referring now to FIGS. 5A to 5K, there is shown a trolley 3, e.g. a galley trolley of an aircraft, according to a yet further embodiment of the invention.

The trolley 3 is similar to the trolley 1 of FIGS. 1A to 1C. Like features are depicted with like reference numerals with the prefix '3' and will therefore not be described further herein.

The trolley 3 of this embodiment has a housing 310, wheels 320, and a compartment 3C in which is provided a plurality of supports 330, 330'.

The trolley 3 of this embodiment is absent the rebate 15 (e.g. the refrigeration compartment) of trolley 1.

The housing 310 comprises opposing side walls 311 and 311', an upper wall 312, a lower wall 312' and a rear wall 313. The side walls 311, 311' and the rear wall 313 extend between the lower wall 312' and the upper wall 312. Alternatively, the rear wall 313 or a portion of the rear wall 313 may be a second door.

In this embodiment the upper wall 312 has a peripheral lip 321 extending thereabout. In this embodiment, the peripheral lip 321 extends around all four sides of the upper wall 312.

The trolley 3 of FIGS. 5A to 5I is absent a front wall. However, it is to be understood that a door (not shown) provides the front wall of the housing and when the door (not shown) is shut the trolley 3 is a closed unit.

Each of the side walls 311, 311', upper wall 312, lower wall 312', rear wall 313 and/or the door may be formed of or may comprise a panel.

Each panel may comprise an outer layer B and an intermediate layer I. The trolley may comprise a carcass, e.g. a metal carcass, which provides the compartment 3C. The panel may be usable with a trolley having a carcass, e.g. a metal carcass, such that the intermediate layer I is located adjacent the carcass.

Alternatively, the or each panel may further comprise an inner layer A', i.e. the or each panel may comprise an outer layer B', an intermediate layer I' and an inner layer A'. For example, both of the side walls 311, 311' may be formed from a panel comprising an outer layer B', an intermediate layer I' and an inner layer A'.

In this embodiment, the first side wall 311 is formed of a panel. The panel comprises an outer layer B', an intermediate layer I' and an inner layer A'. The outer layer B' has an outermost major surface B1' and an innermost major surface B2', the innermost major surface being adjacent the intermediate layer I'. The inner layer A' has a first major surface A1' and a second major surface A2'. The first major surface A1' of the inner layer A' may form the interior surface of the trolley.

The inner layer A' may be made formed from metal materials, for example aluminium or aluminium alloys. At least a portion of the inner layer A' may have a thickness of less than 10 mm, e.g. less than 6 mm, less than 5 mm, less than 4 mm or less than 3 mm, e.g. between 1 mm and 6 mm, e.g. 2 mm or 4 mm thick.

The outer layer B' may be a polymeric/composite material e.g. laminate or a fibre/polymer composite. At least a portion of the outer layer B' may have a thickness of less than 20 mm, e.g. less than 15 mm, less than 12 mm, less than 8 mm or less than 6 mm e.g. 2 mm to 3 mm.

The second major surface A2' of the inner layer A' and the second major surface B2' of the outer layer B' of the or each portion of the housing may be in parallel and opposing relationship. An intermediate layer I' may be located between the inner layer A' and the outer layer B' of the or each portion of the housing, as shown for side wall 311 in FIGS. 5B and 5C.

Figures 5A, 5B:
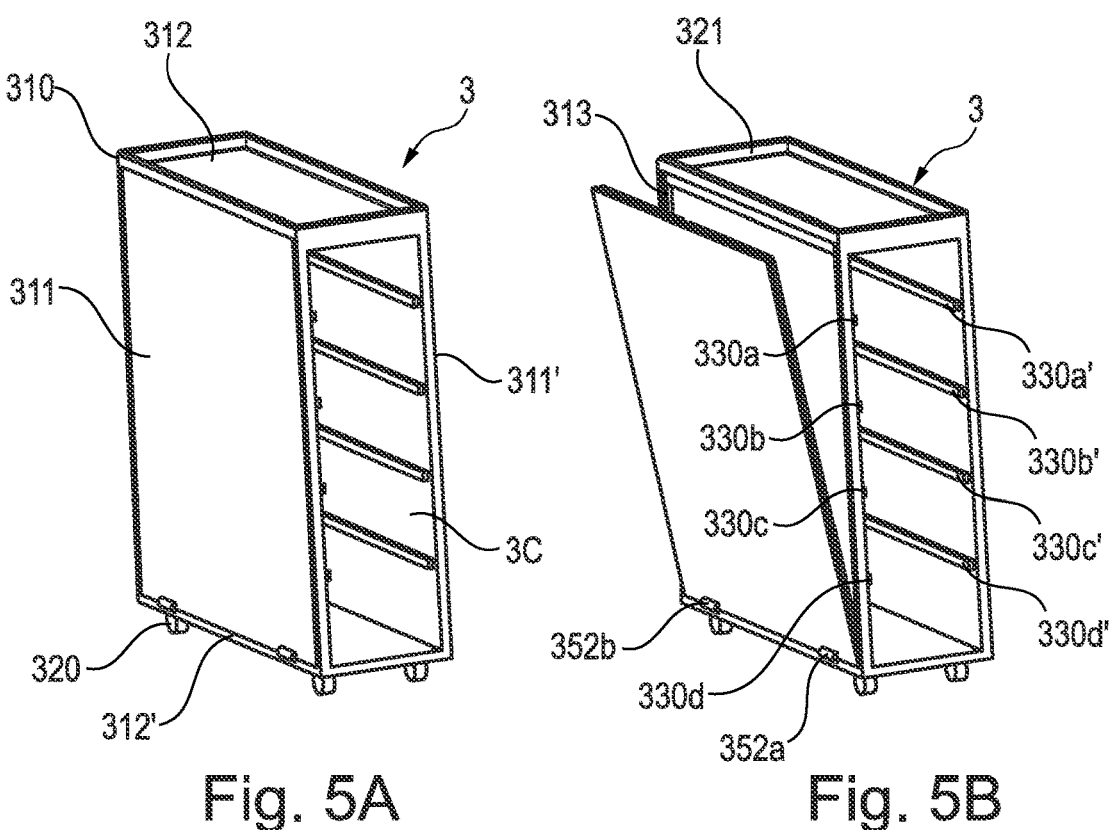
FIGS. 5A to 5K are perspective views of a trolley according to a third embodiment of the invention.
Figure 5C:
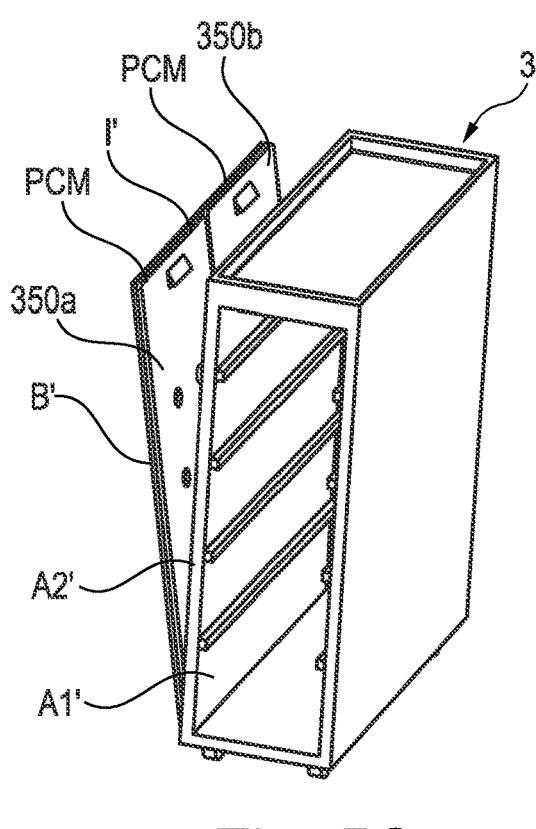
Figure 5D:
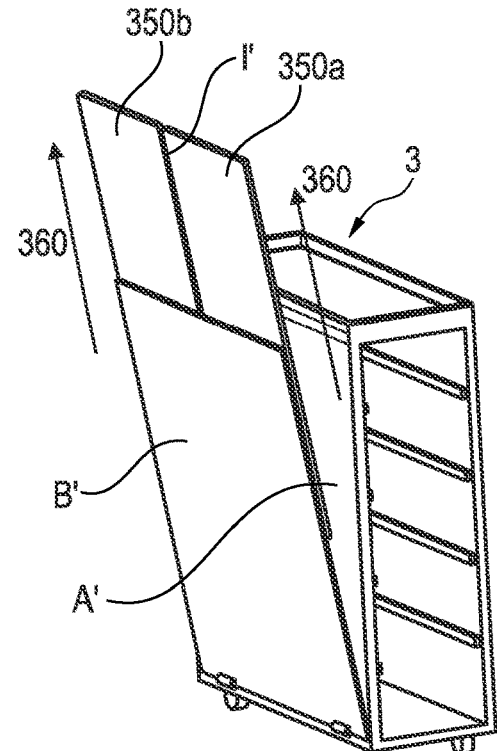
Figure 5E:
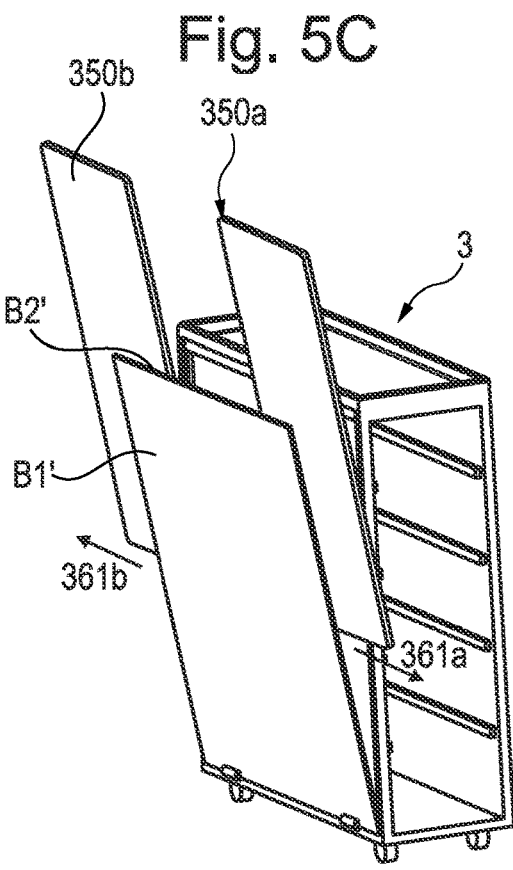
Figure 5F:
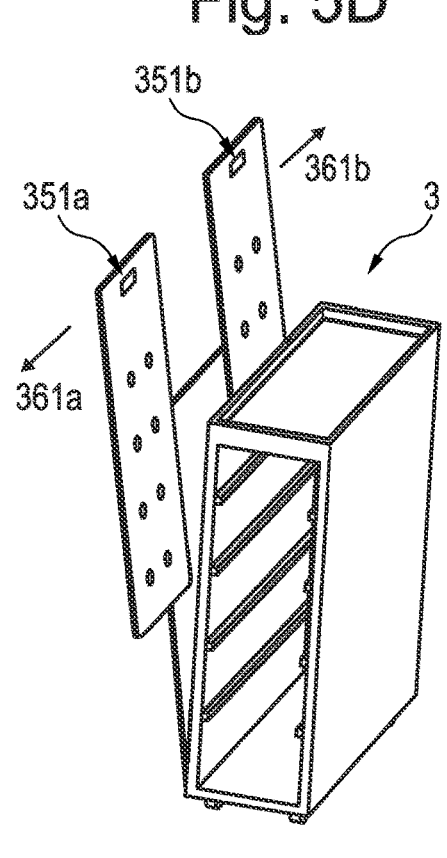

The intermediate layer I' may be formed from a polymeric material. The intermediate layer I' may be a blow-moulded polymer. The intermediate layer I' may be one or more containers 350. The intermediate layer I' may be formed of a single container 350 or the intermediate layer I' may be formed of several containers 350. In this embodiment the intermediate layer I' is formed of two containers 350*a*, 350*b*. The containers 350*a*, 350*b* of this embodiment are half the size of the outer layer B'. The containers 350*a*, 350*b* of the intermediate layer I' of this embodiment are arranged in a side-by-side fashion (as shown in FIG. 5C).

The intermediate layer I' or the or each container 350, may comprise an inner volume in which is located a phase change material PCM.

The intermediate layer I' or the or each container 350, may be movable, e.g. removable, from the trolley 3. The intermediate layer I' or the or each container 350 may comprise a handle. In this embodiment, each of the containers 350*a*, 350*b* comprises a handle 351*a*, 351*b*. The handles 351*a*, 351*b* are located on a first major surface of each of the containers 350*a*, 350*b*. The handles 351*a*, 351*b* are located towards the top of the trolley 3, facing the inner layer A' when the containers 350*a*, 350*b* are located within the trolley 3, i.e. when the containers 350*a*, 350*b* are located between the outer layer B' and the inner layer A'. The handles 351 may be adjacent, e.g. flat or flush, against the containers 350 in a first position (see FIGS. 5C and 5F). The handles 351 may extend, e.g. project outwardly, from the containers 350 in a second position (see FIG. 5J).

Side wall 311 is hingedly connected to the housing 310 by hinges 352*a*, 352*b*. The side wall 311 may further comprise a retainer or retainment means and/or a lock, lock means or securement apparatus or securement means.

In a first condition (FIG. 5A) the side wall 311 will be adjacent the compartment 3C. For example, in this embodiment when the side wall 311 is in a first condition the outer layer B' and intermediate layer I' are adjacent the inner layer A'. The side wall 311 may be secured or securable in place against motion. For example, by engaging mutually engaging portions of the lock, lock means or securement apparatus or securement means described in FIG. 1.

When it is desired to place the trolley 3 in the second condition (FIGS. 5B and 5C), the wall 311, i.e. a portion of the wall, is opened, e.g. pivoted outwardly away from the compartment 3C about the hinge connection. Where present, the mutually engaging portions of the lock, lock means or securement apparatus or securement means may be disengaged, allowing or causing the wall 311 to pivot away from the compartment 3C.

In this embodiment, the intermediate layer I', i.e. the or each container 350, is translatable with the outer layer B', i.e. both the outer layer B' and the intermediate layer I' are pivotable from a first condition to a second condition.

Motion of the wall 311 may be arrested by a retainer or retainment means.

In this embodiment, a phase change material PCM is located in the intermediate layer I', i.e. in the containers 350, between each of the inner layer A' and outer layer B' of the side wall 311.

In this embodiment the plurality of supports 330, 330' are rectangular ledges. The supports 330, 330' are located in parallel pairs. In this example there are four pairs of supports 330*a* to 330*d* and 330*a*' to 330*d*'. The supports 330, 330' are mounted on the first major surface A1' of the inner layer A' of each of the side walls. Supports 330*a* to 330*d* are mounted on the interior surface of the first side wall 311. Supports 330*a*' to 330*d*' are mounted on the interior surface of the second side wall 311'. In this example, a pair of supports 330, 330' are provided to support each receptacle, e.g. a tray holding goods. The trolley 3 of this example is capable of holding 4 receptacles. The receptacles may be located at the top of the trolley 3 on supports 330*a*, 330*a*', the upper middle of the trolley 3 on supports 330*b*, 330*b*', the lower middle of the trolley 3 on supports 330*c*, 330*c*' and/or the bottom of the trolley 3 on supports 330*d*, 330*d*'.

In order to use the trolley 1, 2, 3 once it has been cleaned from a previous use, or when it is required to be used, the wall 11, 211, 311 (or plural walls 11, 11', 211, 211', 311, 311'), e.g. the outer layer B, B' and/or the intermediate layer I, I' (e.g. the or each container 350) are moved, e.g. translated, from a first condition (e.g. FIGS. 1A and 1B, FIGS. 4A to 4C, FIG. 5A) to the second condition (e.g. FIG. 10, FIGS. 4D and 4E, FIGS. 5B and 5C) and the trolley 1, 2, 3 is located in a sub-ambient temperature environment. By providing the trolley 1, 2, 3 in the second condition the PCM material is more able to be cooled within the sub-ambient environment. This reduces the time required to cool the PCM and/or increases the cooling efficiency for the trolley 1, 2, 3.

Accordingly, prior to use, the temperature of the phase change material PCM may be reduced to transition the phase change material PCM from a first state to a second state. In an embodiment the trolley 1, 2, 3 is placed in a cold store for a period of time e.g. 6 to 12 hours. The cold store may be for example a ~+3° C. to +5° C. cold store, e.g. a ~+4° C. fridge. The trolley 1, 2, 3 may be placed in a cold store when it is not required e.g. overnight.

The at least one door 14, 214, 214' of the trolley 1, 2, 3 may be opened fully or partially, when the trolley 1, 2, 3 is located in the cold store. Advantageously, opening the or each door 14, 214, 214' may further reduce the core temperature of the trolley 1, 2, 3. The or each panel or wall, e.g. the or each side wall, 11, 11', 211, 211', 311, 311', or a portion of the or each panel or wall, e.g. one or more layers of the or each panel, may be opened from the first condition to the second condition (as described above).

When it is required to use the trolley 1, 2, 3 the panels or walls, e.g. the side walls 11, 11', 211, 211', 311, 311', or a portion of the or each panel or wall, e.g. one or more layers of the or each panel, will be returned to the first condition and the trolley 1, 2, 3 removed from the cold store to be stocked with the required goods, for example food, beverages, medicaments and/or other required items. The items are located within the compartment C, 2C, 3C, preferably on trays or other receptacles 40 supported by the supports 30, 330, 330'. The trolley 1, 2, 3 may subsequently be returned to the cold store.

After being stocked with items, the trolley 1, 2, 3 may be transported to a required location e.g. the trolley 1, 2, 3 may be transported in a refrigerated vehicle to an awaiting aeroplane.

After the trolley 1, 2, 3 has been removed from the final refrigerated location, e.g. the cold store or the refrigerated vehicle, the phase change material PCM may keep the core temperature of the items located on the trolley 1, 2, 3 cool, e.g. at or below +6° C., +5° C. or +4° C. for approximately four to nine hours, e.g. four to eight hours, four to seven hours or four to six hours. After this period of time has elapsed the core temperature of the items located within the trolley 1, 2, 3 may begin to increase e.g. to above +7° C. e.g. +8° C., or +9° C. By providing a PCM with a phase change of, say +9° C., as the core temperature of the trolley 1, 2, 3 rises to the phase change temperature the core temperature will be prevented from rising any further until all of the PCM has undergone a phase change. Because the walls of the trolley 1, 2, 3 are large, there is a significant amount of PCM located therewithin. The large volume of PCM is sufficient to maintain the core temperature below +10° C. for the required period.

After use, the trolley 1, 2, 3 may be unloaded and/or cleaned. The trolley 1, 2, 3 may then be returned to a cold store prior to re-use.

Where the trolley 1, 2, 3 comprises an intermediate layer I, I' or one or more containers 350, the or each intermediate layer I, I' or the or each container 350, may be removed or removable from the trolley 1, 2, 3, after use. The or each intermediate layer I, I' or the or each container 350, may be movable, e.g. detached or detachable from the trolley 1, 2, 3 and/or the outer layer B, B' of the panel.

When it is desired to remove the or each intermediate layer I, I' or the or each container 350, from the trolley, the trolley may first be positioned into the second condition by pivoting outwardly the or each wall, e.g. the side walls 311, 311', e.g. the outer layer B, B' and the intermediate layer I, I' (or the or each container 350), as described above.

With the trolley in the second position, the or each intermediate layer I, I' or the or each container 350, may be accessible. The operator may first lift the or each intermediate layer I, I' or the or each container 350, in an upwards direction (as indicated by the arrows 360 in FIG. 5D). The operator may then move the or each intermediate layer I, I' or the or each container 350, towards the rear or front of the trolley (as indicated by the arrows 361 in FIGS. 5E and 5F). For example, where the or each intermediate layer I, I' comprises two containers 350a, 350b, a first container 350a may be moved in a first direction towards the front of the trolley (arrow 361a in FIGS. 5E and 5F) and a second container 350b may be moved in a second direction towards the rear of the trolley (arrow 361b in FIGS. 5E and 5F).

Figures 5G, 5H, 5I, 5J, 5K:
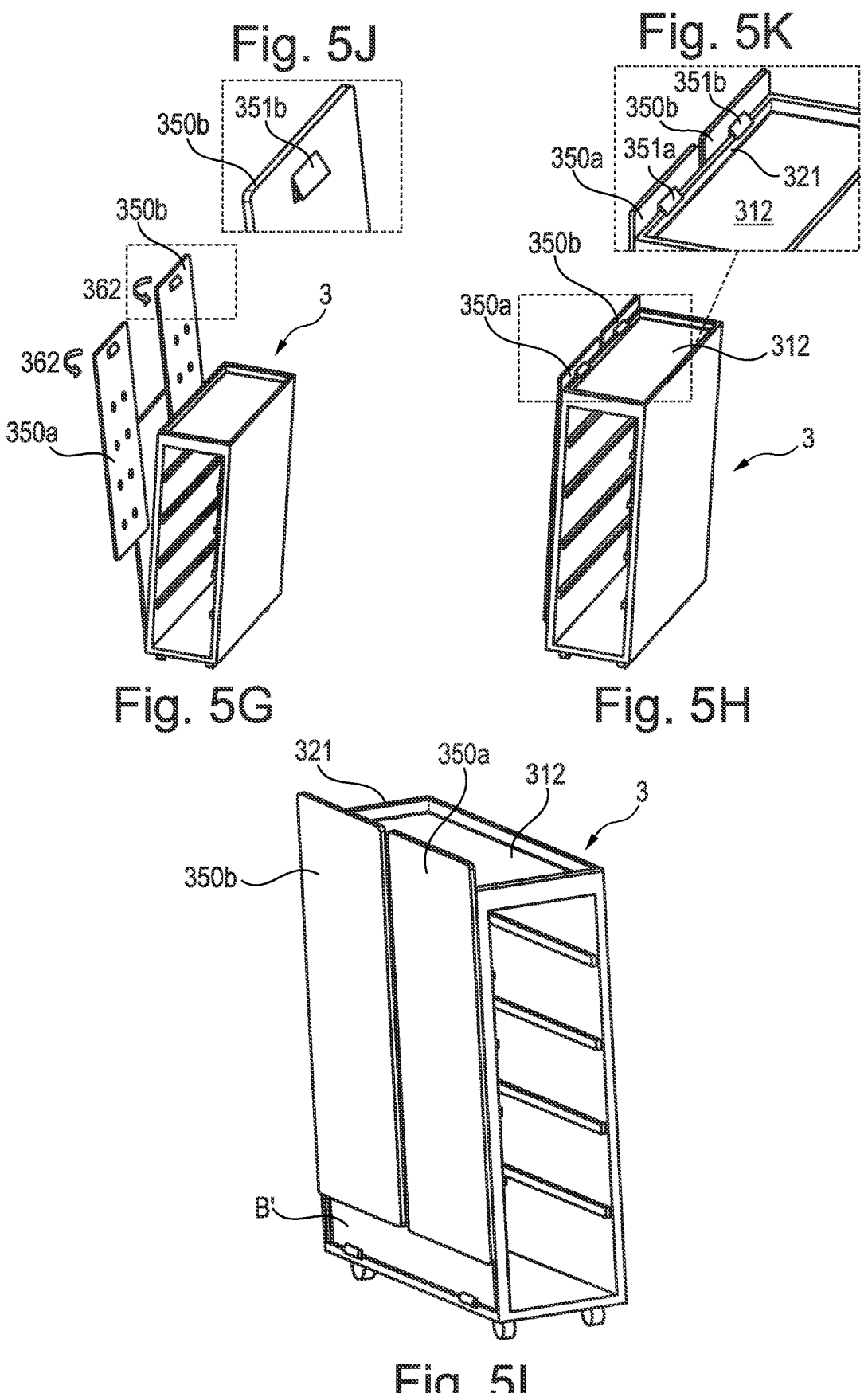

When, the or each intermediate layer I, I' or the or each container 350, has been removed from the trolley the handle of the or each intermediate layer I, I' or the handle 351 of the or each container 350, may be moved from a first position (FIG. 5C), where the or each handle is adjacent, e.g. flat or flush, against the intermediate layer I, I' or container 350 to a second position (FIGS. 5G and 5J), where the or each handle 351 may extend, e.g. project outwardly, from the intermediate layer I, I' or container 350 (as indicated by the arrows 362 in FIG. 5G). FIG. 5J shows a close up of the container 350b and handle 351b of FIG. 5G, wherein handle 351b is in a second, extended position.

Alternatively, the or each handle may be moved from a first condition to a second condition prior to removing the or each intermediate layer I, I' or the or each container 350, from the trolley. Advantageously, the one or more handles 350 may help the operator in moving, e.g. removing, the intermediate layer I, I' or the or each container 350, from the trolley.

Advantageously, once removed from the trolley, the or each intermediate layer I, I' or the or each container 350, may be stored on the trolley itself. For example, the or each intermediate layer I, I' or the or each container 350, may be hung on the peripheral lip 321 of the upper wall 312 of the trolley, when the trolley is in a first condition, i.e. when the walls of the trolley, e.g. the outer layer B, B', are adjacent the cavity C, 2C, 3C.

The or each intermediate layer I, I' or the or each container 350, may be hung on the peripheral lip 321 of the upper wall 312 by the handle 350 of the or each intermediate layer I, I' or the handle 350 of the or each container 350 (see FIGS. 5H and 5I). FIG. 5K shows a close up of FIG. 5H, wherein containers 350a, 350b are hanging on the peripheral lip 321 of the upper wall 312 of the trolley by handles 351a, 351b, which are in a second, extended position.

In our experiments we have concluded the following:
1. A room temperature trolley placed in a cold store in the first condition with the door 14 closed: the core temperature of the trolley 1 may fall to ~6.5° C., after being left in the cold store for 12 hours.
2. A room temperature trolley placed in a cold store in the first condition with the door 14 opened: the core temperature of the trolley 1 to reaches ~4° C. in 12 hours.
3. A room temperature trolley placed in a cold store in the second condition with the door 14 open: the core temperature of the trolley 1 reaches ~3-4° C. in less than 6 to 8 hours.

The above results clearly demonstrate the effectiveness of providing cooling to the trolley when it is in the second condition. Moreover, by locating the trolley 1, 2, 3 in a cold store at 4° C. for ca. 6 to 8 hours a PCM with a phase change temperature of +9° C. will completely freeze, thereby 'charging' the trolley 1, 2, 3 with refrigeration capacity for foods.

Figure 3:
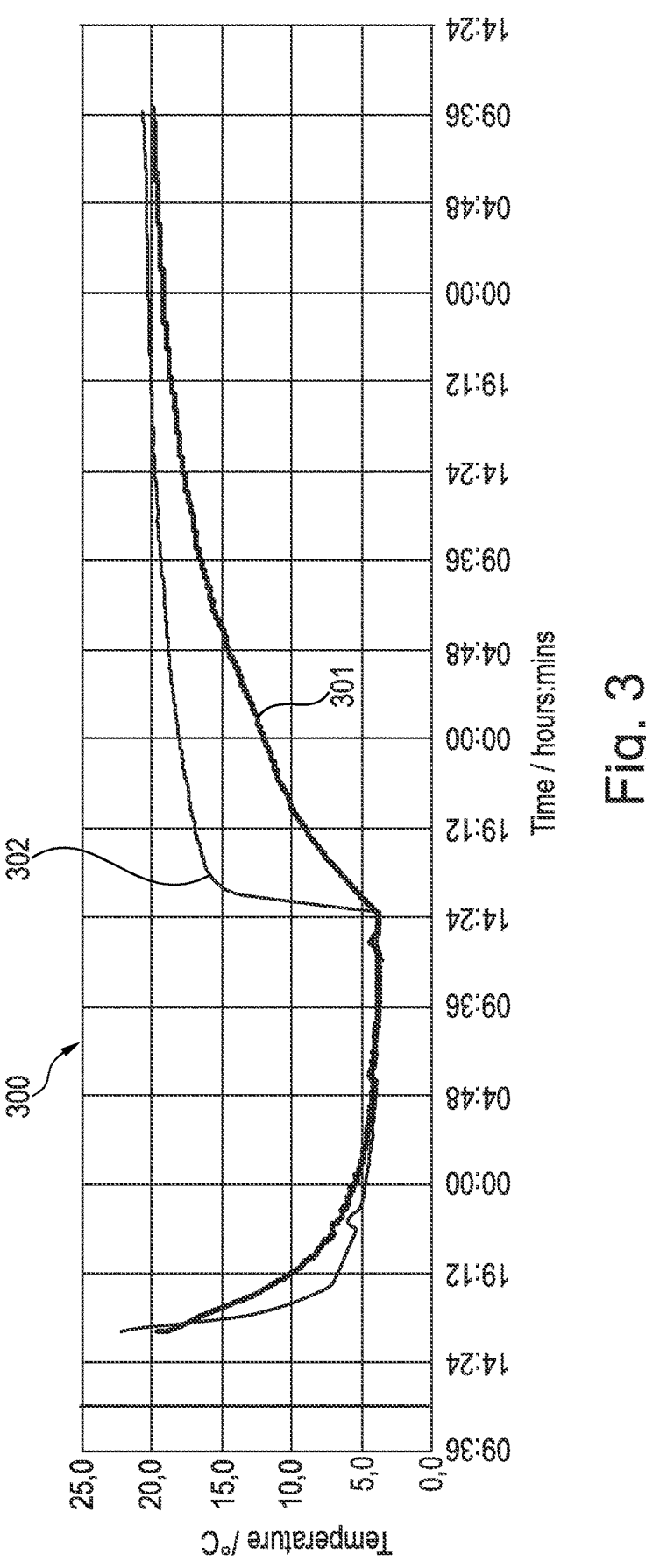
FIG. 3 is a temperature profile for a trolley with a phase change material located within its walls according to an embodiment of the invention.
Figures 4A, 4B:
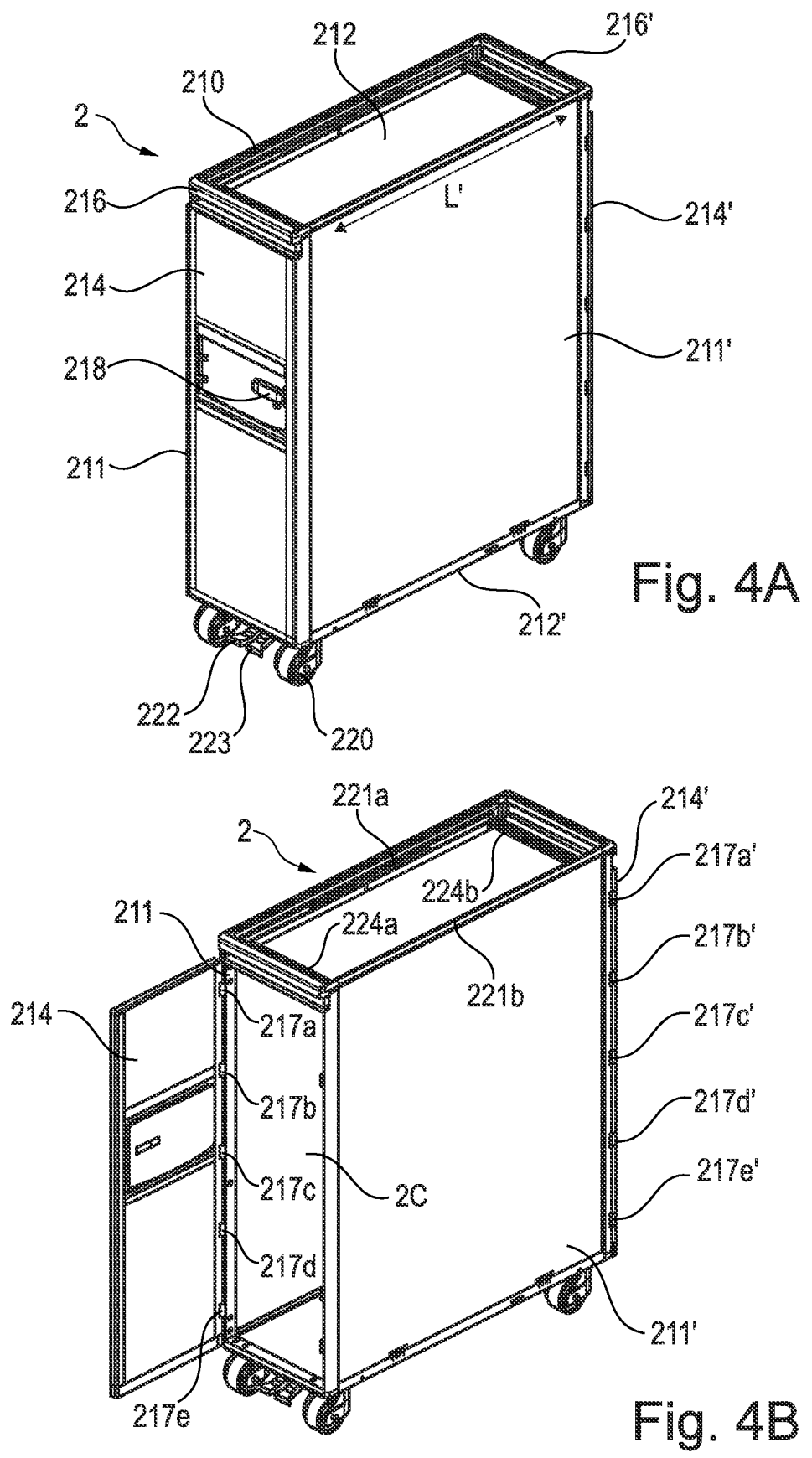
FIGS. 4A to 4E are perspective views of a trolley according to a second embodiment of the invention.
Figure 4C:
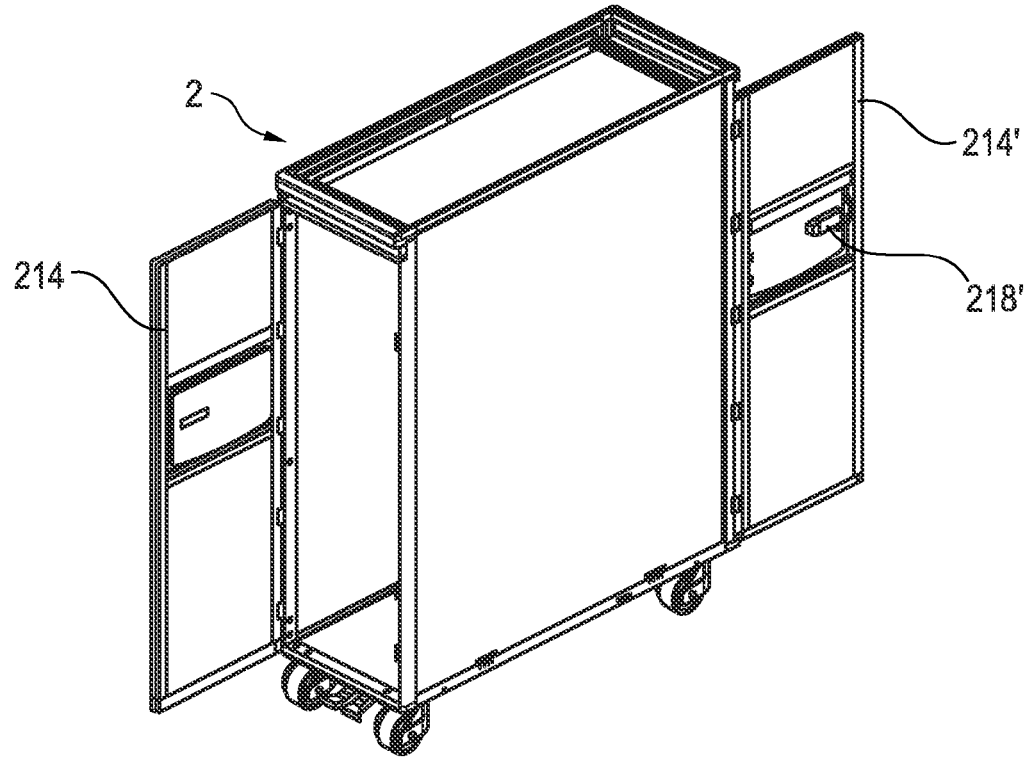
Figure 4D:
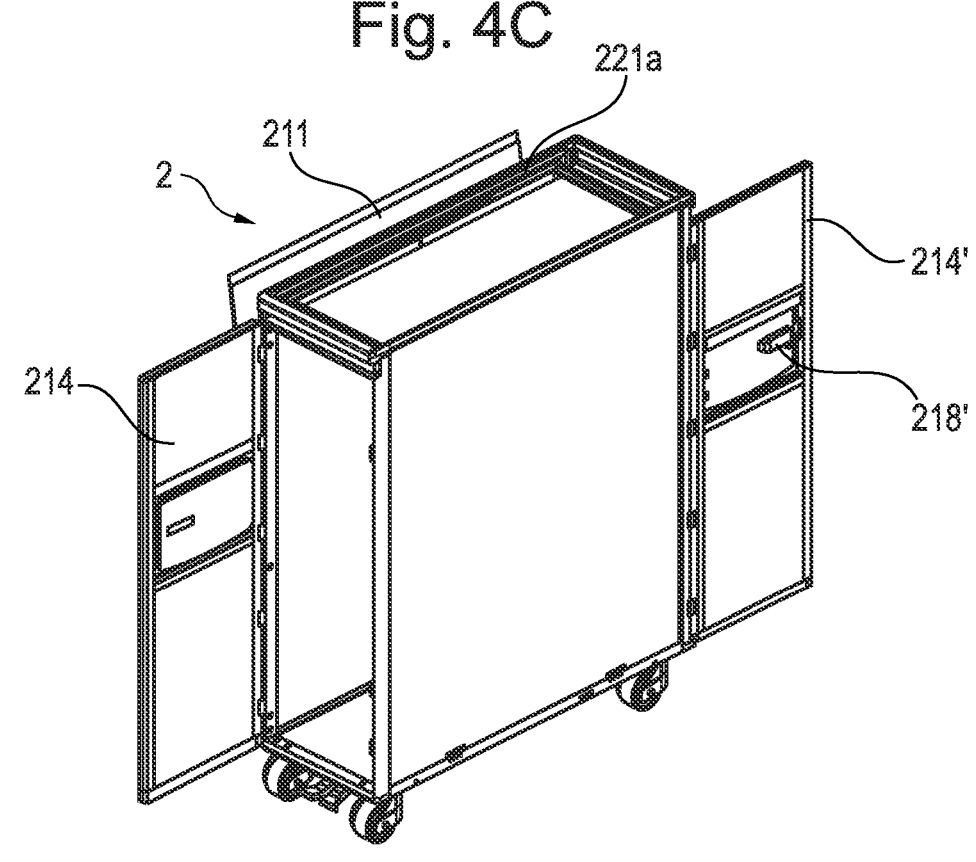
Figure 4E:
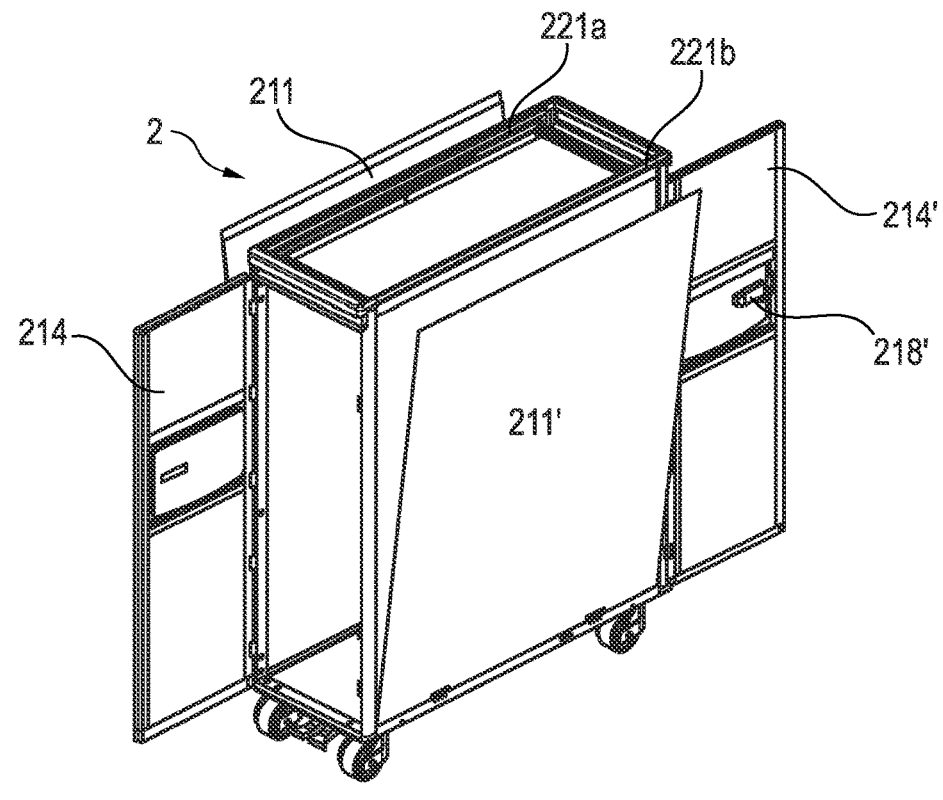

Referring now to FIG. 3, there is shown a graph 300 displaying the temperature changes over time for a trolley, e.g. a trolley according to the embodiment of FIGS. 1A to 1C, with a phase change material located within its walls in accordance with the invention, according to an embodiment of the invention. The phase change material has a phase change temperature of +9 degrees Celsius.

The graph 300 displays a temperature profile of an item located within the trolley (line 301), (in this case a drinks can), in comparison to the ambient temperature (line 302), wherein the ambient temperature is measured by a sensor mounted on the outside of the trolley.

A drinks can was loaded into a trolley and the door closed. The temperature of the outside of the trolley and of the drinks can were continuously monitored.

The trolley was located in a cold store with a nominal temperature of ~+3° C. As will be seen there is an initial decrease in temperature, for both the item located within the trolley (line 301) and the ambient temperature (line 302).

After removal of the trolley from the cold store (time 14:24), the ambient temperature rapidly increases (line 302) whereas, the temperature of the item located within the trolley (line 301) remains under 10 degrees Celsius for ~6 hours and under 15 degrees Celsius for ~16 hours. Advantageously, this means food can be kept at a safe consumption temperature for up to 6 hours, limiting food wastage.

This should be contrasted with standard cooling regimes in which dry ice is deployed. Tests have shown that the cooling efficiency of a trolley having a top compartment loaded with dry ice is 30% less in the middle of the galley trolley and greater than 60% less at the bottom of the galley trolley. These tests have shown that the bottom half of the trolley is unable to keep food or drinks under 10° Celsius for more than 3 hours when using dry ice.

Further tests have shown that once dry ice the galley trolley reaches above 10° C., the rate of temperature rise increases and then rapidly exceeds 15° C. The temperature rise is experienced in all compartments of the trolley within 30 minutes to 1 hour. This is because as dry ice sublimates it releases its stored energy. This is important for two reasons. Firstly, there is a thin line between a safe consumption temperature and an unsafe temperature. Secondly, food has to be discarded when the temperature reaches above 15° C.

Figure 6:
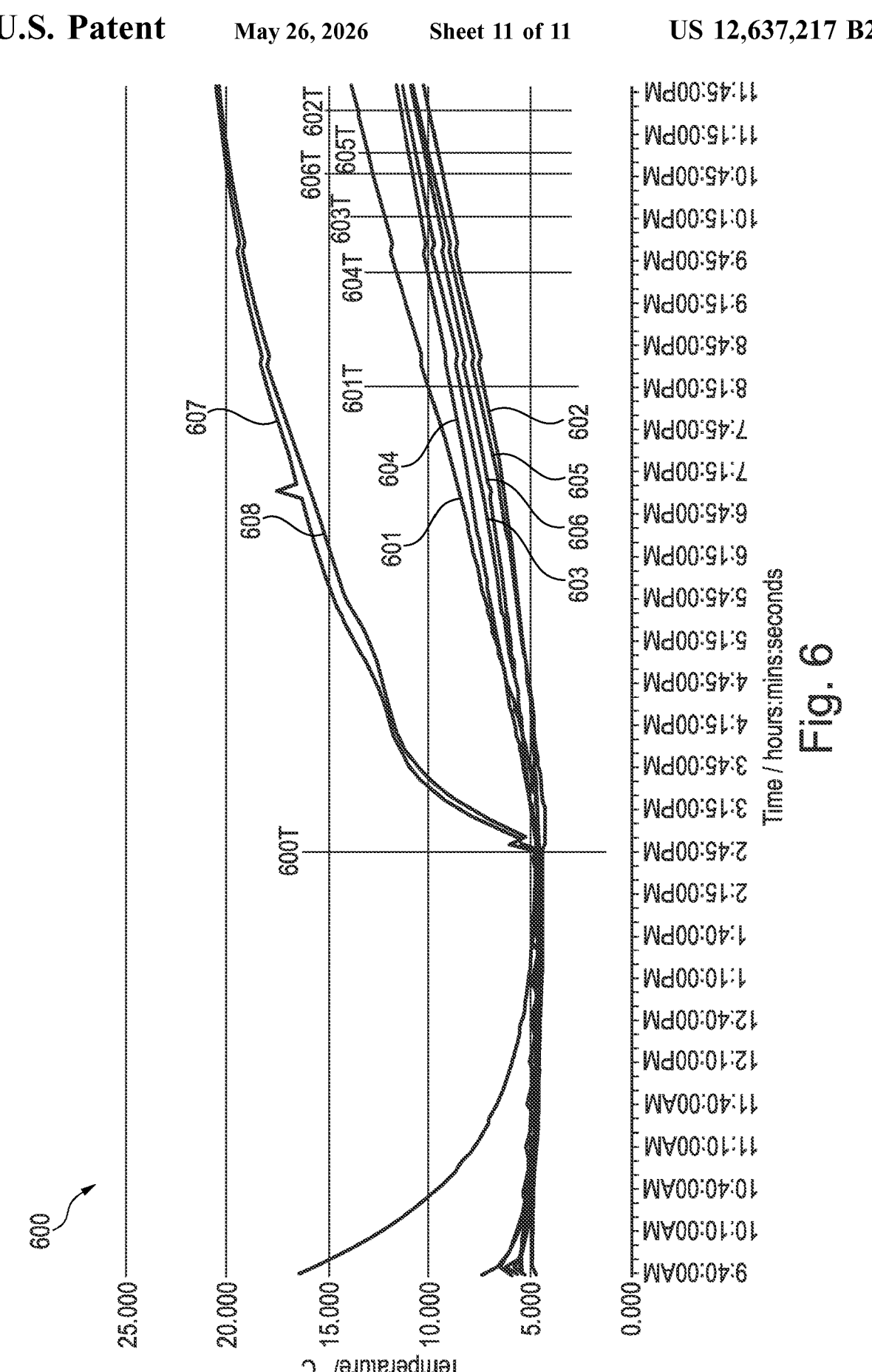
FIG. 6 is a temperature profile for a trolley with a phase change material located within its walls according to a further embodiment of the invention.

Referring now to FIG. 6, in accordance with an embodiment of the invention, there is shown a graph 600 displaying the temperature changes over time for a trolley, e.g. a trolley according to FIGS. 5A to 5I, wherein both side walls 311, 311' are translatable from a first condition proximate the compartment 3C to a second condition further from the compartment 3C, and wherein a phase change material is located within the side walls 311, 311', e.g. a phase change material is located in the or each container 350 of the intermediate layer I, I'. The phase change material has a phase change temperature of +9 degrees Celsius.

The graph 600 displays a temperature profile of items located within the trolley (lines 601 to 606), in comparison to the ambient temperature monitored by temperature probes on the external body of the trolley (lines 607 and 608).

A first item (in this case a food item) was located on a receptacle at the top of the trolley to the left hand side (line 601), a second item (in this case a drinks can) was located on a receptacle in the upper middle of the trolley to the left hand side (line 602), a third item (in this case a food item) was located on a receptacle at the lower middle of the trolley to the left hand side (line 603), a fourth item (in this case a drinks can) was located on a receptacle at the bottom of the trolley to the left hand side (line 604), a fifth item (in this case a food item) was located on a receptacle at the upper middle of the trolley to the right hand side (line 605), a sixth item (in this case a drinks can) was located on a receptacle in the lower middle of the trolley to the right hand side (line 604).

The external probes were mounted on a side wall (line 607) and on the door (line 608). The probe on the side wall (line 607) was located on the intermediate layer when the side wall was in the first condition and moved to the exterior surface of the side wall, i.e. the outer layer, when the side wall was in the second condition, i.e. after the trolley was removed from the cold store.

The temperatures of the outside of the trolley and of the items located within the trolley were continuously monitored.

The door and walls were opened, e.g. the outer layer and intermediate layer of the side walls were translated from the first condition proximate the compartment to the second condition further from the compartment, before the trolley was located in a cold store with a nominal temperature of ~+3° C. As will be seen there is an initial decrease in temperature, for all items located within the trolley (lines 601 to 606) and for the external temperature readings (lines 607 and 608). It took 2 hours 30 minutes for the phase change material to change to a frozen (solid) state. The trolley reached the desired temperature of <5° C., i.e. all probes recorded a temperature of <5° C., after 3 hours 45 minutes (time 1:25 pm).

On reaching the desired temperature (<5° C.), the trolley was kept in the cold store for a further 1 hour 20 minutes.

The trolley was removed from the cold store after a total of 5 hours 5 minutes (time 2:45 pm, line 600T). After removal of the trolley from the cold store the walls and door were closed. The ambient temperature, recorded by the external probes (lines 607 and 608) increased rapidly whereas, the temperature of the items located within the trolley (lines 601 to 606) remain under 10° C. for at least ~5 hours 30 mins.

Advantageously, this means food can be kept at a safe consumption temperature for up to 5 hours 30 minutes if located at the top of trolley (line 601), for up to 6 hours 55 if located at the bottom of the trolley (line 604) and for up to 7 hours 30 mins if located in the middle of the trolley (lines 602, 603, 605, 606), limiting food wastage.

The first item located in the top left of the trolley reached 10° C. after 5 hours 30 minutes (time 8:15 pm, line 601T), the second item located in the upper middle and to the left of the trolley reached 10° C. after 8 hours 45 minutes (time 11:30 pm, line 602T), the third item located in the lower middle and to the left of the trolley reached 10° C. after 7 hours 30 minutes (time 10:15 pm, line 603T), the fourth item located in the bottom left of the trolley reached 10° C. after 6 hours 55 minutes (time 9:40 pm, line 604T), the fifth item located in the upper middle and to the right of the trolley reached 10° C. after 8 hours 15 minutes (time 11:00 pm, line 605T), the sixth item located in the lower middle and to the right of the trolley reached 10° C. after 8 hours 5 minutes (time 10:50 pm, line 606T).

As with the above embodiment, this embodiment offers advantages over using dry ice. Moreover, this example illustrates that a trolley having an intermediate layer, e.g. containers, that can be exposed during cooling, allows for faster cooling without an increase in storage size. Further, the items located in the trolley, and in particular the items located within the middle of the trolley, may be kept cooler for longer periods.

Clearly the trolley of the invention has improved performance compared to a prior art dry ice-loaded trolley.

It will be appreciated by those skilled in the art that several variations to the aforementioned embodiments are envisaged without departing from the scope of the invention.

It will also be appreciated by those skilled in the art that any number of combinations of the aforementioned features and/or those shown in the appended drawings provide clear advantages over the prior art and are therefore within the scope of the invention described herein.

The invention claimed is:

1. A galley trolley of an aircraft, the galley trolley comprising a housing and a compartment for location of goods, the housing comprising two side walls each having sides, an upper wall, a lower wall, a rear wall and a door which provides the front of the trolley, wherein at least one of said two side walls comprises an outermost layer and an innermost layer, wherein the innermost layer is non-moveable and defines at least a portion of the compartment for the location of the goods, wherein the outermost layer and the innermost layer define a cavity therebetween configured for receiving a removable first layer, and wherein the outermost layer is a movable layer which is secured to at least a portion of the housing via at least one hinge located away from the sides of said at least one side wall and is movable between a first condition where the movable layer is proximate the innermost layer and a second condition where the movable layer is further from the innermost layer.

2. The galley trolley according to claim 1, wherein the at least one movable layer is translatable or pivotable between the first condition and the second condition.

3. The galley trolley according to claim 1, wherein the at least one movable layer is hingedly connected to at least a portion of the housing.

4. The galley trolley according to claim 3, wherein the at least one movable layer is secured to the housing by at least one of a bracket, a runner, and a parallelogram linkage.

5. The galley trolley according to claim 1, wherein the at least one movable layer is locked or lockable in the first condition.

6. The galley trolley according to claim 1, wherein at least a portion of the housing is made from a panel, said panel comprising the removable first layer and the outermost layer, wherein the removable first layer is located in the cavity.

7. The galley trolley according to claim 6, wherein the outermost layer provides or defines an outermost periphery of the housing.

8. The galley trolley according to claim 6, wherein the outermost layer is a relatively thermally insulating layer.

9. The galley trolley according to claim 6, wherein the outermost layer has a thickness of less than 20 mm.

10. The galley trolley according to claim 6, wherein the outermost layer is formed from or comprises a polymeric or composite material.

11. The galley trolley according to claim 6, wherein the first layer is formed from or comprises a polymeric material.

12. The galley trolley according to claim 6, wherein the first layer has a phase change material located therein.

13. The galley trolley according to claim 12, wherein the phase change material has a phase change temperature from −100 to 100 degrees Celsius.

14. The galley trolley according to claim 1, wherein the innermost layer is a relatively thermally conductive layer which is more thermally conductive than the outermost layer.

15. The galley trolley according to claim 1, wherein the innermost layer has a thickness of less than 10 mm.

16. The galley trolley according to claim 6, wherein the first layer is removable from the trolley.

17. The galley trolley according to claim 1, wherein the outermost layer extends a depth of the trolley from the door to the rear wall.

18. The galley trolley according to claim 1, wherein both of said side walls each comprise the movable layer and are movable between a first condition where the outermost layer is proximate the innermost layer and the second condition where the outermost layer is further from the innermost layer.

* * * * *